United States Patent
Liang et al.

(10) Patent No.: US 9,368,977 B2
(45) Date of Patent: Jun. 14, 2016

(54) BATTERY EQUALIZATION CIRCUITS FOR SERIES CHARGING/DISCHARGING AND CONTROLLING METHODS THEREOF

(71) Applicant: Cheng Kung University, Tainan (TW)

(72) Inventors: Tsorng-Juu Liang, Tainan (TW); Yi-Hsun Hsieh, Tainan (TW); Wan-Yi Horng, Tainan (TW); Yi-Yuan Chung, Tainan (TW); Jiann-Fuh Chen, Tainan (TW)

(73) Assignee: CHENG KUNG UNIVERSITY (TW)

( * ) Notice: Subject to any disclaimer, the term of this patent is extended or adjusted under 35 U.S.C. 154(b) by 615 days.

(21) Appl. No.: 13/765,379

(22) Filed: Feb. 12, 2013

(65) Prior Publication Data

US 2013/0214733 A1    Aug. 22, 2013

(30) Foreign Application Priority Data

Feb. 16, 2012  (TW) .............................. 101105157 A
Jun. 20, 2012  (TW) .............................. 101122119 A

(51) Int. Cl.
*H02J 7/00*    (2006.01)
*H02J 7/02*    (2016.01)

(52) U.S. Cl.
CPC .............. *H02J 7/0014* (2013.01); *H02J 7/025* (2013.01); *H02J 7/0018* (2013.01)

(58) Field of Classification Search
CPC ....................................................... H02J 7/025
USPC ....................................................... 320/108
See application file for complete search history.

(56) References Cited

U.S. PATENT DOCUMENTS

| 5,371,454 | A | * | 12/1994 | Marek | B60L 11/185 320/108 |
|---|---|---|---|---|---|
| 6,100,663 | A | * | 8/2000 | Boys | B60L 11/182 320/108 |
| 2010/0295510 | A1 | | 11/2010 | Moussaoui et al. | |
| 2012/0194127 | A1 | * | 8/2012 | Kobayashi | B60L 11/182 320/108 |
| 2013/0214733 | A1 | * | 8/2013 | Liang | H02J 7/0014 320/108 |

OTHER PUBLICATIONS

Office Action issued in Taiwanese Patent Application No. 10420050270 on Jan. 15, 2015, consisting of 9 pp.
Nasser H. Kuthut, Deepakraj M. Divan, and Donal W. Novotny, "Charge Equalization for Series Connected Batteries Strings," IEEE Trans. on Industry Application, vol. 31, pp. 562-568, No. 3, May/Jun. 1995.
Hong-Sun Park, Chol-Ho Kim, Ki-Bum Park, Gun-Woo Moon, and Joong-Hui Lee, "Design of a Charge Equalizer Based on Battery Modularization," IEEE Trans. on Vehicular Technology, vol. 57, pp. 3216-3223, No. 7, Sep. 2009.

* cited by examiner

*Primary Examiner* — Suresh Memula
(74) *Attorney, Agent, or Firm* — Volpe and Koenig, P.C.

(57) ABSTRACT

Battery equalization circuits for series charging/discharging and controlling methods thereof are provided. The provided circuit includes a set of series-connected batteries, a switching converter and a magnetic element coupled balance circuit including a magnetic element coupled to the switching converter, wherein the magnetic element takes a branch current from the switching converter to the series-connected batteries so as to cause the set of series-connected batteries to reach a balance.

16 Claims, 31 Drawing Sheets

US 9,368,977 B2

BATTERY EQUALIZATION CIRCUITS FOR SERIES CHARGING/DISCHARGING AND CONTROLLING METHODS THEREOF

CROSS-REFERENCES TO RELATED APPLICATIONS

The application claims the benefits of Taiwan Patent Application Numbers 101105157 and 101122119, respectively filed on Feb. 16, 2012 and Jun. 20, 2012, in the Taiwan Intellectual Property Office, the disclosures of which are incorporated herein in their entirety by reference.

FIELD OF THE INVENTION

The present invention relates to a battery equalization circuit for series charging/discharging. In particular, the battery equalization circuit for series charging/discharging relates to a battery equalization circuit having a magnetic element for series charging/discharging.

BACKGROUND OF THE INVENTION

Secondary battery includes various technical types, e.g. the Lead-Acid battery, the Ni—Cd battery, the Ni-MH battery, and the Lithium Ion battery all belong to the secondary battery scope. Each of the single battery of the various types of batteries has a relatively lower voltage, and multiple batteries are connected in series to provide the power according to various applied voltages so as to achieve the requirement of raising the voltage. The common single batteries have the rated voltages listed as follows, e.g. the rated voltage of the Lead-Acid battery is 2V, that of the Ni—Cd battery, or that of the Ni-MH battery is 1.2V, and that of the Lithium Ion battery is 3.7V.

When the batteries are connected in series for various applications, there is an imbalance caused by minor differences of inner characteristics, aged factor, or various operational environments. And, the electricity capacity of battery could not be released completely, and the battery is over discharged are also phenomena result in the life span of a set of series-connected batteries being shorter than that of a single battery.

For solving the aforementioned problems of imbalance, the electricity capacity of battery could not be released completely, and the battery is over discharged, when the batteries are connected in series for various applications, there are battery equalization circuits for series charging in the prior art. Currently, the battery equalization circuits for series charging employed most frequently are the flyback type configurations or forward type configurations.

FIG. 1(a) shows a schematic circuit diagram of a first battery equalization circuit for series charging/discharging in the prior art. In FIG. 1(a), the first battery equalization circuit for series charging/discharging in the prior art includes a (power) source/load, a charger/discharger, a set of series-connected batteries 121, including 1~N batteries $B_1$~$B_N$, a balance circuit and a (power) source (refer to "Charge Equalization for Series Connected Batteries Strings," IEEE Trans. on Industry Application, vol. 31, pp. 562-568, no. 3, May/June 1995). FIG. 1(b) shows a schematic circuit diagram of the first battery equalization circuit for series charging as shown in FIG. 1(a). In FIG. 1(b), it includes a (power) source, a charger, a set of series-connected batteries including 1~N batteries $B_1$~$B_N$, a charge equalization converter and a (power) source. The drawbacks of the first battery equalization circuit for series charging/discharging in the prior art are: two sets of circuits, two sets of power sources, separated controls, and more components are required.

FIG. 2(a) shows a schematic diagram of a second battery equalization circuit for series charging/discharging in the prior art. In FIG. 2(a), the second battery equalization circuit for series charging/discharging in the prior art includes a (power) source/load, a charger/discharger, a set of series-connected batteries 121, including 1~N batteries $B_1$~$B_N$, and a balance circuit (refer to "Design of a Charge Equalizer Based on Battery Modularization," IEEE Trans. on Vehicular Technology, vol. 57, pp. 3216-3223, no. 7, September 2009). FIG. 2(b) shows a schematic circuit diagram of the second battery equalization circuit for series charging as shown in FIG. 2(a), including a (power) source, a charger, a set of series-connected batteries including 1~N batteries $B_1$~$B_N$, and a balance circuit. The drawbacks of the second battery equalization circuit for series charging/discharging in the prior art are: there might be one more set of inductor, and separated controls and more components are required. The above-mentioned prior arts have respective drawbacks, and thus an improvement is required.

Keeping the drawbacks of the prior arts in mind, and employing experiments and research full-heartily and persistently, the applicant finally conceived a battery equalization circuit for series charging/discharging and controlling method thereof.

SUMMARY OF THE INVENTION

It is a primary objective of the present invention to provide a battery equalization circuit for series charging/discharging and controlling method thereof. The proposed battery equalization circuit possesses the advantages of having a lower cost, a flexible control and a simple protection apparatus, and being easy to maintain, easy to achieve the battery equalization, and easy to accomplish the battery management.

According to the first aspect of the present invention, a battery equalization circuit includes a balanced charging/discharging circuit comprising a converter, and a balance circuit comprising a set of input terminals, plural sets of output terminals, plural switches, and a coupled inductor having a primary winding and plural secondary windings respectively series-connected to the plural switches, wherein each of the plural sets of output terminals is connected to a respective one of the plural switches and a respective one of the plural secondary windings, and a set of series-connected batteries having plural batteries, each of which has a positive terminal and a negative terminal, wherein each of the plural sets of output terminals is connected to the positive and the negative terminals of a respective one of the plural batteries, and the set of input terminals is in one of two states being coupled to and being series-connected to the converter to cause a branch current to flow through the plural secondary windings so as to balance the set of series-connected batteries.

According to the second aspect of the present invention, a battery equalization circuit comprises a set of series-connected batteries, a switching converter, and a magnetic element coupled balance circuit including a magnetic element coupled to the switching converter, wherein the magnetic element obtains a branch current from the switching converter, and the branch current flows to the set of series-connected batteries so as to cause the set of series-connected batteries to reach a balance.

According to the third aspect of the present invention, a controlling method of a battery equalization circuit, wherein the battery equalization circuit includes a magnetic element, comprises a step of using the magnetic element to generate a branch current from the battery equalization circuit so as to balance the battery equalization circuit.

The present invention can be best understood through the following descriptions with reference to the accompanying drawings, in which:

DETAILED DESCRIPTION OF THE PREFERRED EMBODIMENT

Although the following description contains many specifications for the purposes of illustration, anyone of ordinary skill in the art will appreciate that many variations and alterations to the following details are within the scope of the invention. Accordingly, the following preferred embodiment of the invention is set forth without any loss of generality to and without imposing limitations upon, the claimed invention.

Figure 3A:
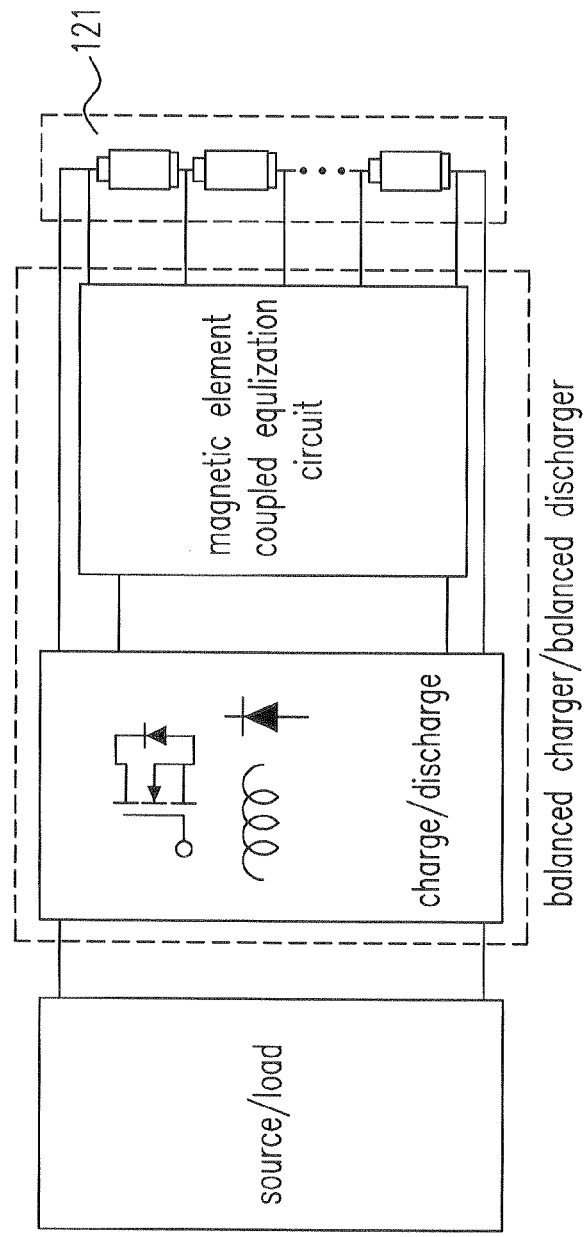
FIG. 3(a) shows a schematic circuit diagram of a battery equalization circuit for series charging/discharging according to the first to the twenty-third preferred embodiments of the present invention.
Figure 3B:
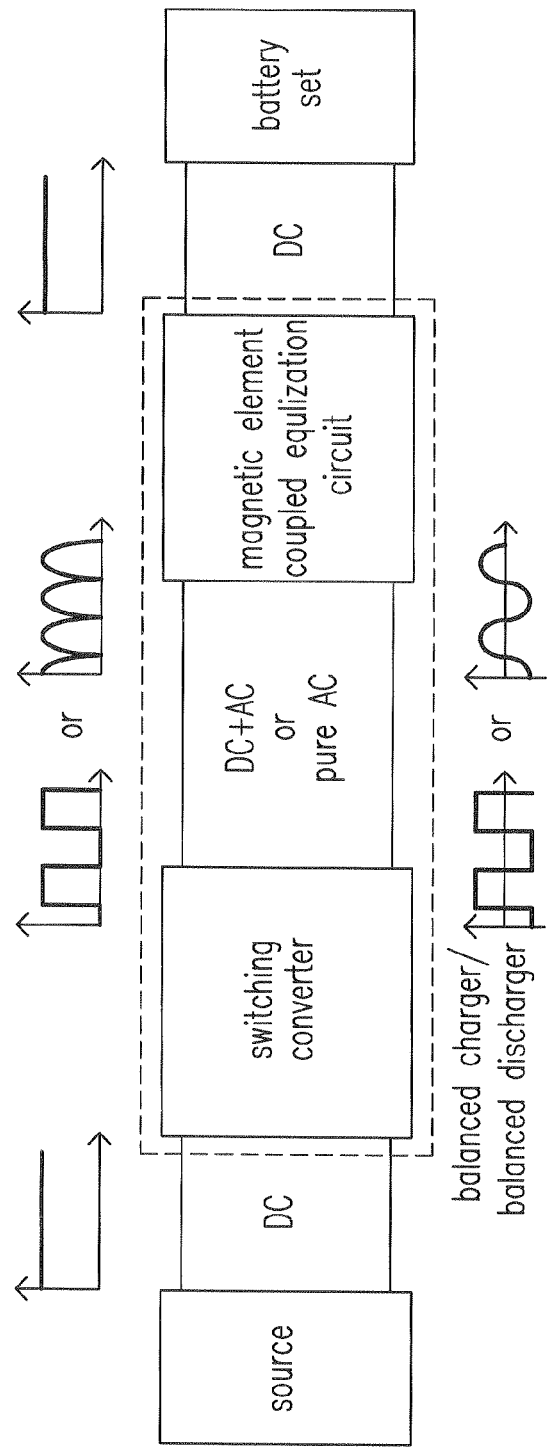
FIG. 3(b) shows a schematic circuit diagram of a battery equalization circuit for series charging/discharging when the charger/discharger as shown in FIG. 3(a) includes a switching converter and a coupled magnetic element.

FIG. 3(a) shows a schematic circuit diagram of a battery equalization circuit for series charging/discharging according to the first to the twenty-third preferred embodiments of the present invention. In FIG. 3(a), the battery equalization circuit for series charging/discharging includes a (power) source/load, a balanced charger/balanced discharger (including a charger/discharger, and a magnetic element coupled balance circuit) and a set of series-connected batteries 121, including 1~N batteries $B_1$~$B_N$. FIG. 3(b) shows a schematic circuit diagram of a battery equalization circuit for series charging/discharging when the charger/discharger as shown in FIG. 3(a) is a switching converter. In FIG. 3(b), the switching converter will generate a (DC+AC) signal or a pure AC signal during the processing procedure, the magnetic element is electrically connected to the switching converter, and employs the AC signal or the pure AC signal to provide the balance energy required by the battery equalization circuit, and the battery set 121 is the set of series-connected batteries 121 as shown in FIG. 3(a). The magnetic element is a coupled inductor, a voltage transformer, or a current transformer, wherein the coupled inductor employs the magnetic field to store the energy, and releases the energy stored in the primary side thereof to the secondary side thereof, the current transformer is employed as an energy channel, does not store any energy, connects the AC power source at the primary side thereof, and transmits the energy to the secondary side thereof, and the voltage transformer is also employs as an energy channel, and couples the voltage from the primary side thereof to the secondary side thereof.

As shown in FIG. 3(b), the core concept of the present invention is that a branch current is obtained from the switching converter via the magnetic element, causes a balanced current to be coupled to the battery set 121, i.e. the required balance energy is obtained via the magnetic element, and the balance energy is transmitted to the set of series-connected batteries 121 via processing (current limiting or DC/AC converting). The energy is obtained via the coupled voltage of the voltage transformer, and the energy is processing via current limiting when the magnetic element is the voltage transformer. The energy is obtained via the magnetic inductor or the current transformer, and the energy is processing via DC/AC converting when the magnetic element is the magnetic inductor or the current transformer.

Figure 4A:
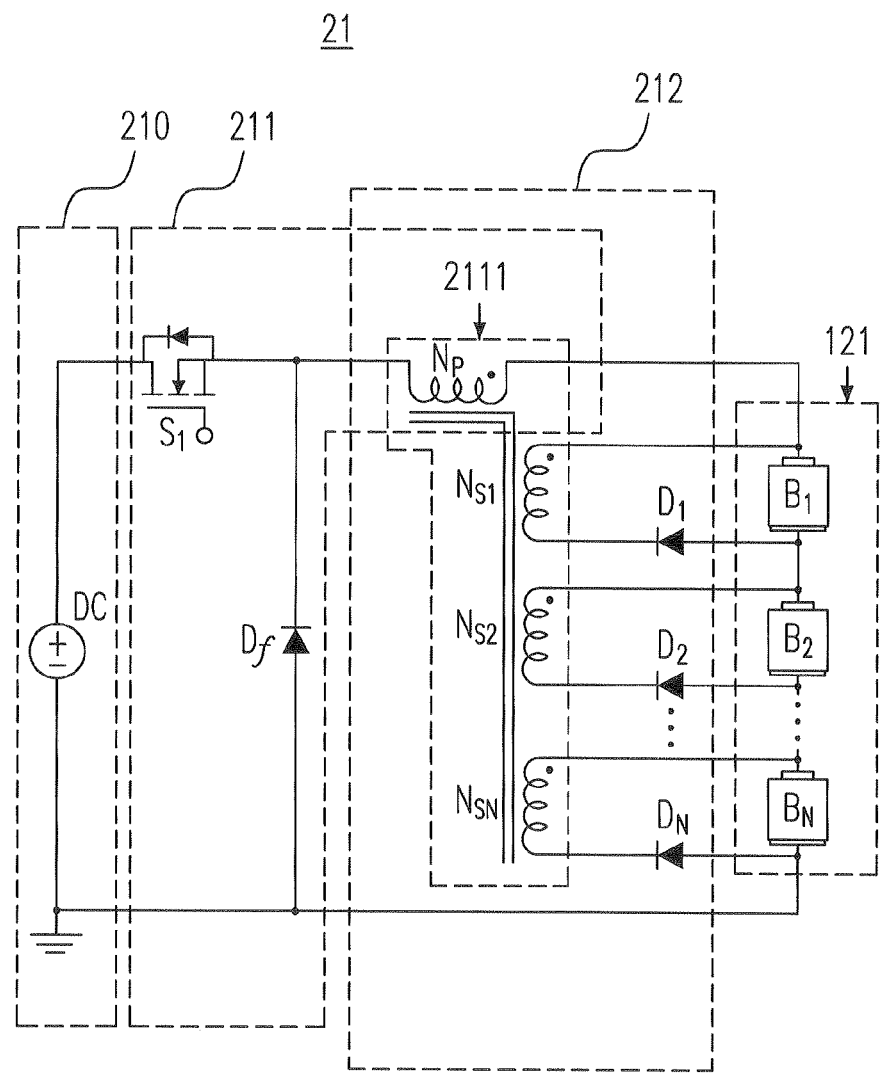
FIGS. 4(a)-4(c) respectively shows a schematic circuit diagram of a buck-flyback type battery equalization circuit for series charging/discharging/charging and discharging according to the first preferred embodiment of the present invention.

FIG. 4(a) shows a schematic circuit diagram of a buck-flyback type battery equalization circuit for series charging according to the first preferred embodiment of the present invention. In FIG. 4(a), the buck-flyback type battery equalization circuit for series charging 21 includes a power source 210 (it is a DC power source DC), a buck converter 211, a balance circuit for series-connected batteries 212, and the set of series-connected batteries 121, wherein the buck converter 211 includes a switch $S_1$ (it could be a MOSFET), a flywheel diode $D_f$, and a primary winding of the coupled inductor 2111 ($N_P$ is the number of turns in the primary side, $N_{S1}$~$N_{SN}$ indicate that the respective number of turns in the secondary side and the total no. of sets is N, and the primary winding of the coupled inductor 2111 is coupled to a main inductor of the converter 211), and the balance circuit 212 includes the coupled inductor 2111 and N rectifying diodes $D_1$~$D_N$.

Figure 4B:
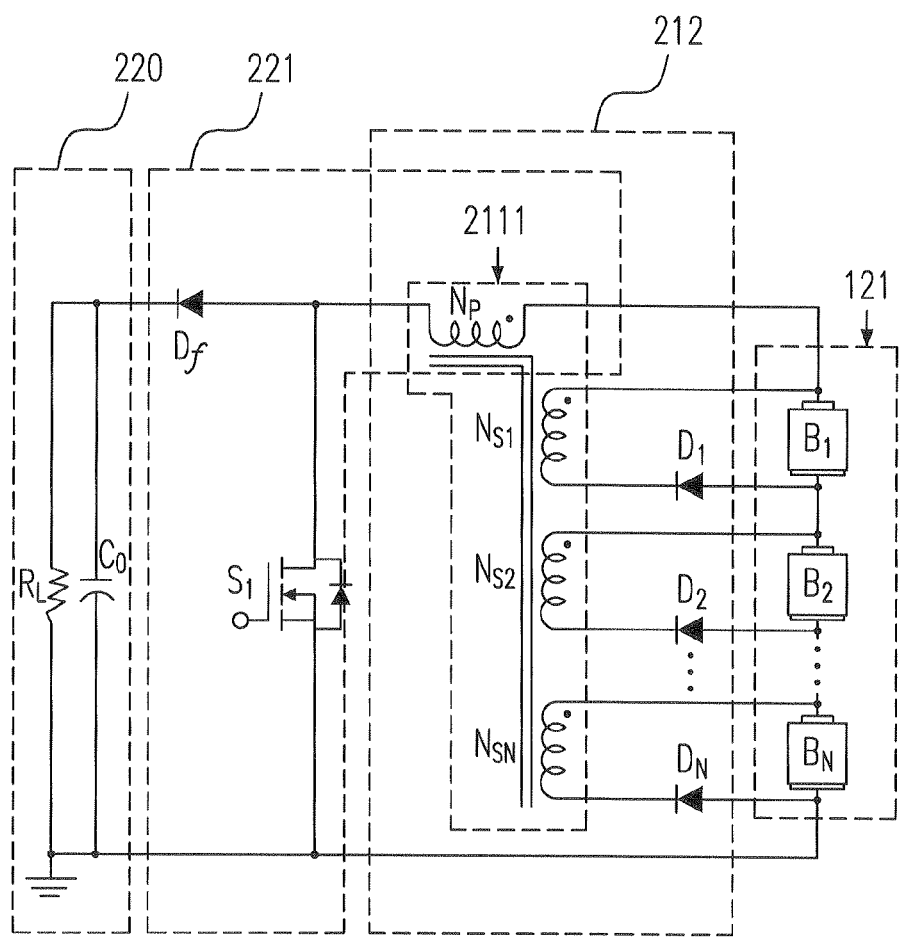

FIG. 4(b) shows a schematic circuit diagram of a buck-flyback type battery equalization circuit for series discharging according to the first preferred embodiment of the present invention. In FIG. 4(b), the buck-flyback type battery equalization circuit for series discharging 22 includes a load circuit 220 (including a load resistor $R_L$ and an output capacitor $C_O$), a buck converter 221, the balance circuit for series-connected batteries 212, and the set of series-connected batteries 121. The differences between the buck converter 221 and the buck converter 211 of FIG. 4(a) are that the switch $S_1$ and the flywheel diode $D_f$ are switching positions.

Figure 4C:
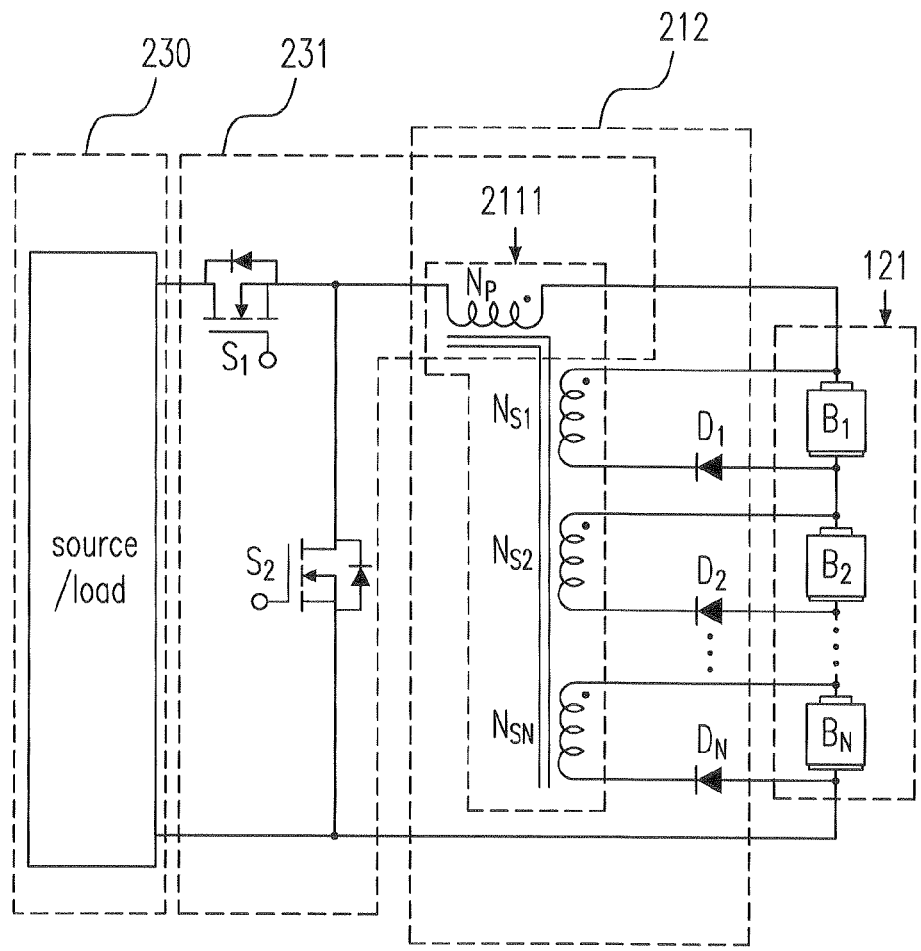

FIG. 4(c) shows a schematic circuit diagram of a buck-flyback type battery equalization circuit for series charging and discharging according to the first preferred embodiment of the present invention. In FIG. 4(c), the buck-flyback type battery equalization circuit for series charging and discharging 23 includes a power source/load 230, a buck converter 231, a balance circuit for series-connected batteries 212, and the set of series-connected batteries 121. The difference between the buck converter 231 and the buck converter 211 of FIG. 4(a) is that the flywheel diode $D_f$ is replaced by a switch $S_2$.

Figure 4D:
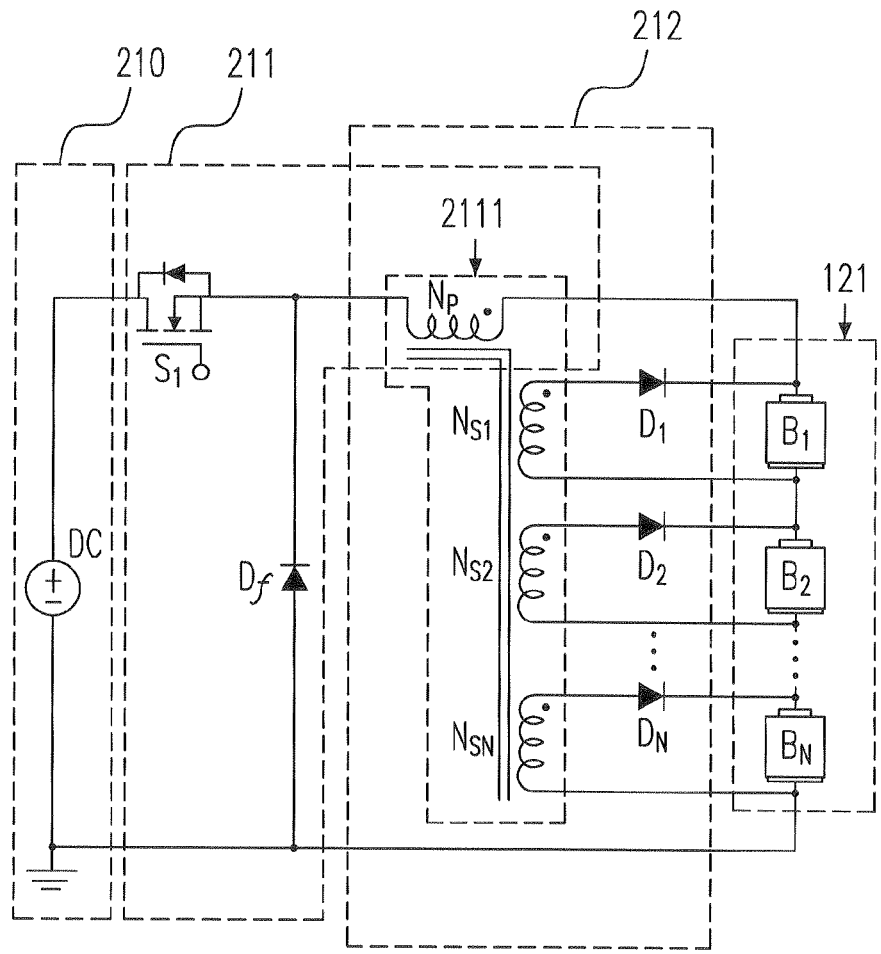
FIG. 4(d) shows a schematic circuit diagram of an equivalent circuit of the buck-flyback type battery equalization circuit for series charging as shown in FIG. 4(a)

FIG. 4(d) shows a schematic circuit diagram of an equivalent circuit of the buck-flyback type battery equalization circuit for series charging as shown in FIG. 4(a). The differences between them are that the anode of each of the plural diodes $D_1$~$D_N$, being used as switches, is changed to connect with the first terminal of the respective secondary winging, the cathode of each of the plural diodes $D_1$~$D_N$ is changed to connect with the positive terminal of the respective plural batteries $B_1$~$B_N$, and the second terminal of the respective secondary winging is changed to connect with the negative terminal of the respective plural batteries $B_1$~$B_N$. The equivalent circuit described here can be applied to the applications of the following second to the seventh preferred embodiments of the present invention.

Figure 5A:
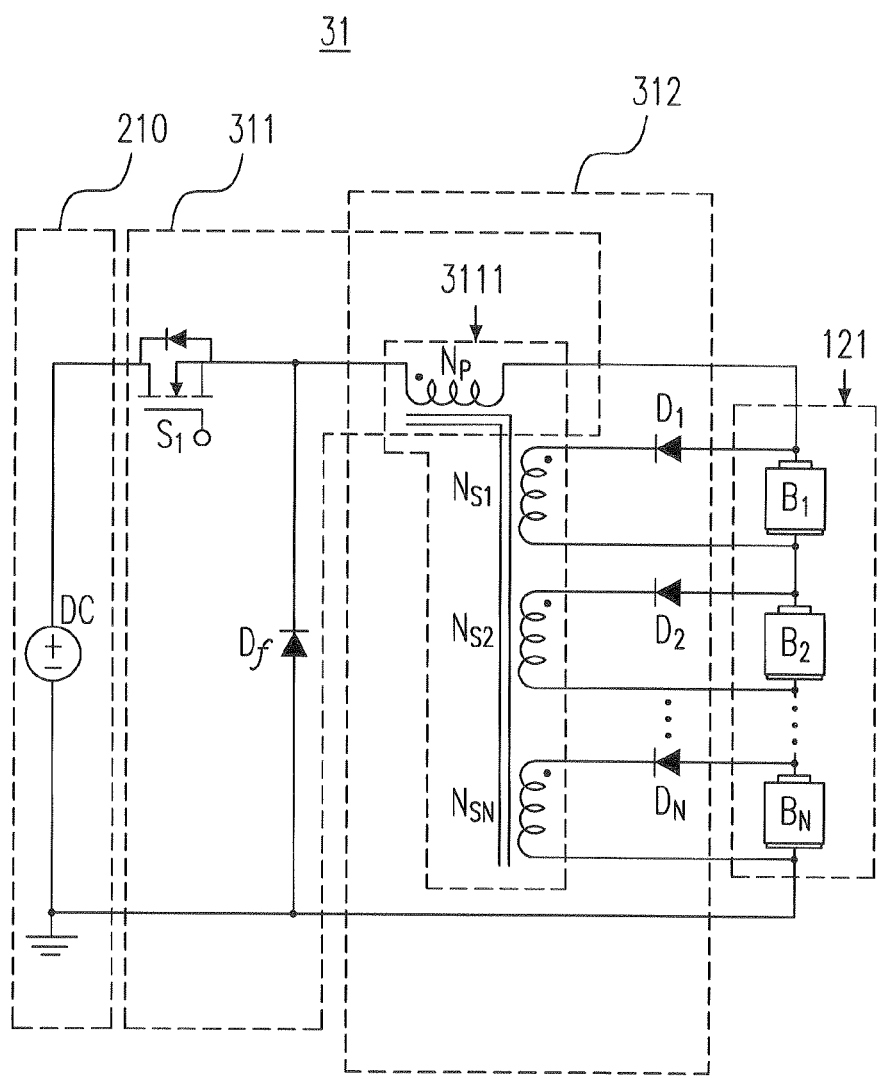
FIGS. 5(a)-5(c) respectively shows a schematic circuit diagram of a buck-forward type battery equalization circuit for series charging/discharging/charging and discharging according to the second preferred embodiment of the present invention.

FIG. 5(a) shows a schematic circuit diagram of a buck-forward type battery equalization circuit for series charging according to the second preferred embodiment of the present invention. In FIG. 5(a), the buck-forward type battery equalization circuit for series charging 31 includes a power source 210 (it is a DC power source DC), a buck-forward converter 311, a balance circuit for series-connected batteries 312, and the set of series-connected batteries 121, wherein the buck-forward converter 311 includes a switch $S_1$ (it could be a MOSFET), a flywheel diode $D_f$, and a primary winding of the coupled inductor 3111 ($N_P$ is the number of turns in the primary side, $N_{S1}$~$N_{SN}$ indicate that the respective number of turns in the secondary side and the total no. of sets is N, and the primary winding of the coupled inductor 3111 is coupled to a main inductor of the converter 311), and the balance circuit 312 includes the coupled inductor 3111 and N rectifying diodes $D_1$~$D_N$.

Figure 5B:
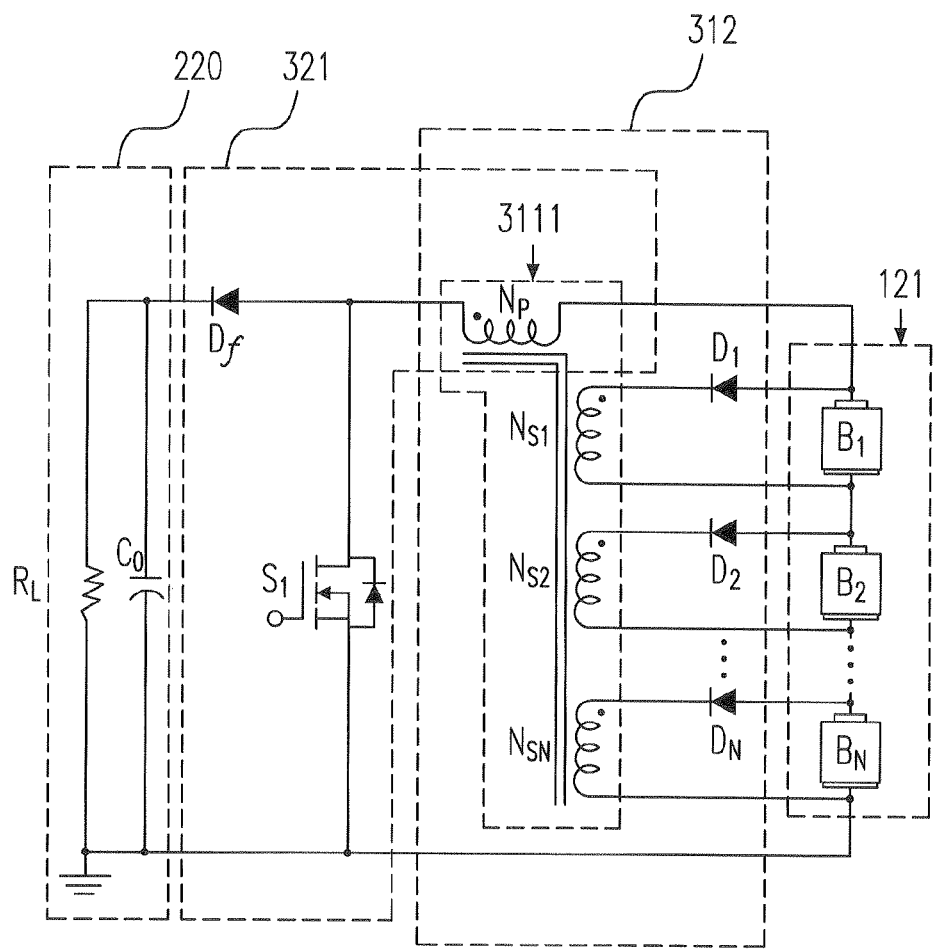

FIG. 5(b) shows a schematic circuit diagram of a buck-forward type battery equalization circuit for series discharging according to the second preferred embodiment of the present invention. In FIG. 5(b), the buck-forward type battery equalization circuit for series discharging 32 includes a load circuit 220 (including a load resistor $R_L$ and an output capacitor $C_O$), a buck-forward converter 321, the balance circuit for series-connected batteries 312, and the set of series-connected batteries 121. The differences between the buck-forward converter 321 and the buck-forward converter 311 of FIG. 5(a) are that the switch $S_1$ and the flywheel diode $D_f$ are switching positions.

Figure 5C:
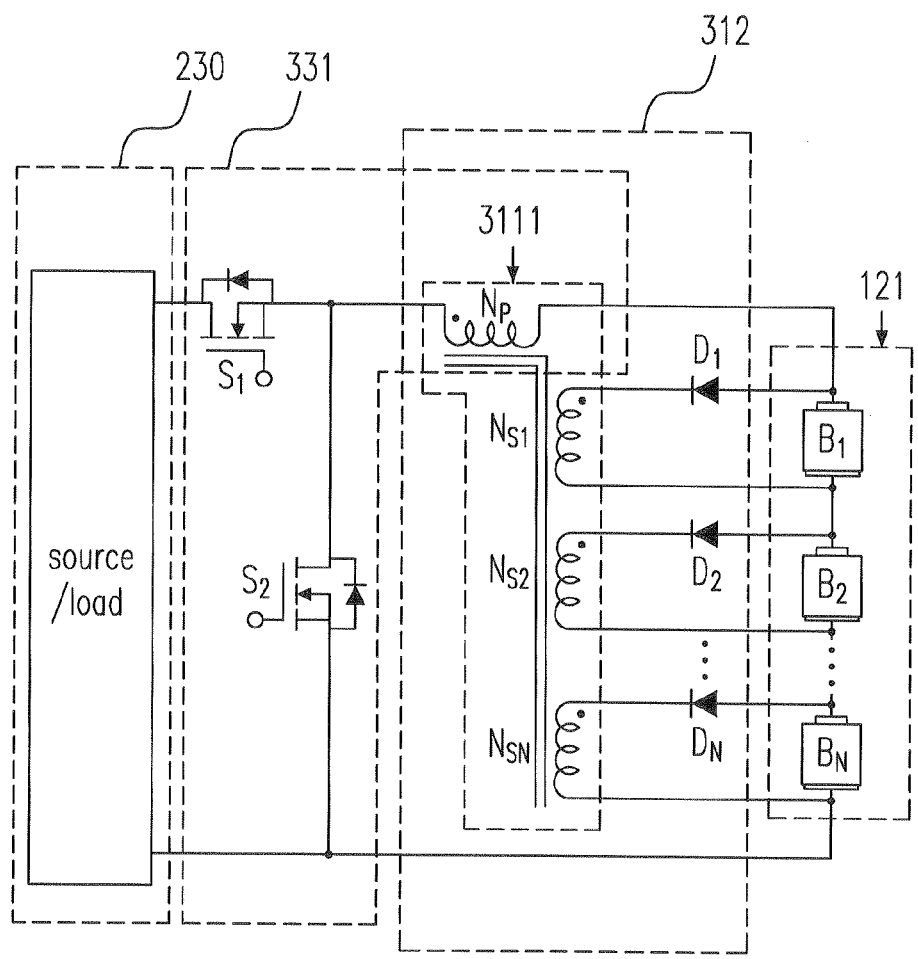

FIG. 5(c) shows a schematic circuit diagram of a buck-forward type battery equalization circuit for series charging and discharging according to the second preferred embodiment of the present invention. In FIG. 5(c), the buck-forward type battery equalization circuit for series charging and discharging 33 includes a power source/load 230, a buck-forward converter 331, a balance circuit for series-connected batteries 312, and the set of series-connected batteries 121. The difference between the buck-forward converter 331 and the buck-forward converter 311 of FIG. 5(a) is that the flywheel diode $D_f$ is replaced by a switch $S_2$.

The differences between the circuits as shown in FIGS. 4(a)-4(c) and FIGS. 5(a)-5(c) are that the Np dot positions of the coupled inductors 2111/3111 are the reverse of each other.

Figure 1A:
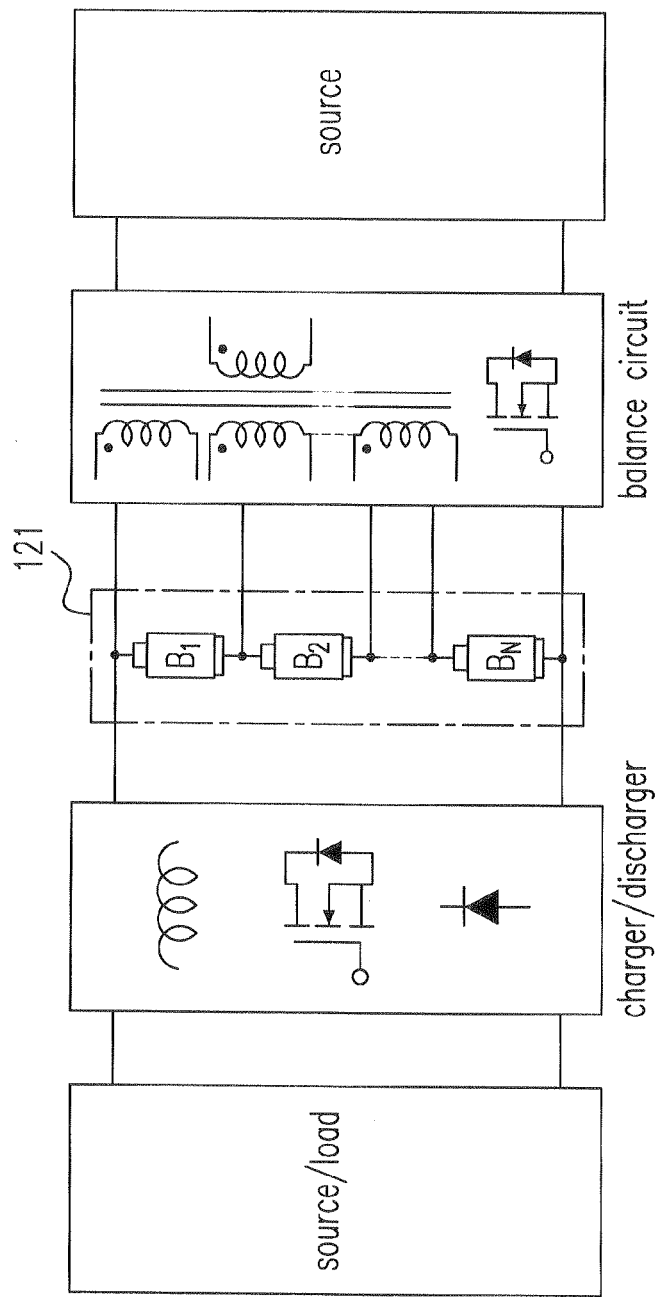
FIG. 1(a) shows a schematic circuit diagram of a first battery equalization circuit for series charging/discharging in the prior art.
Figure 1B:
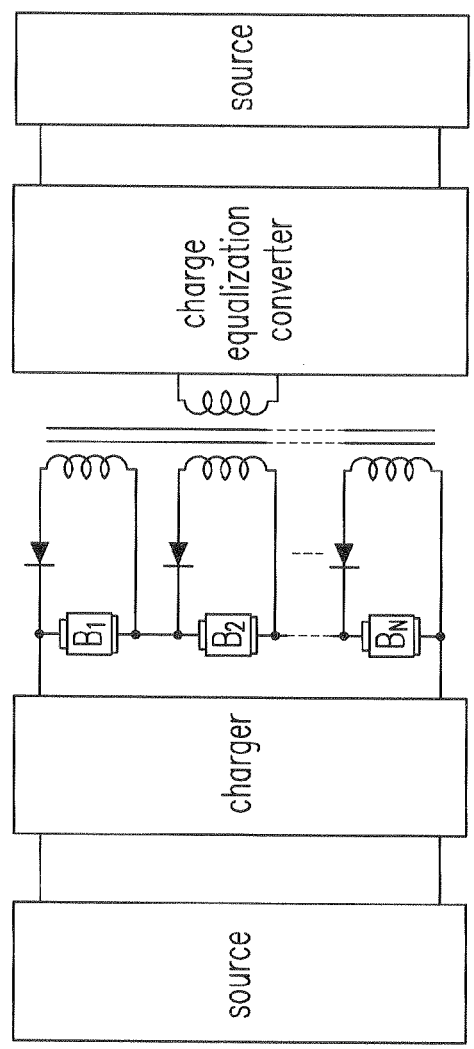
FIG. 1(b) shows a schematic circuit diagram of the first battery equalization circuit for series charging as shown in FIG. 1(a)
Figure 2A:
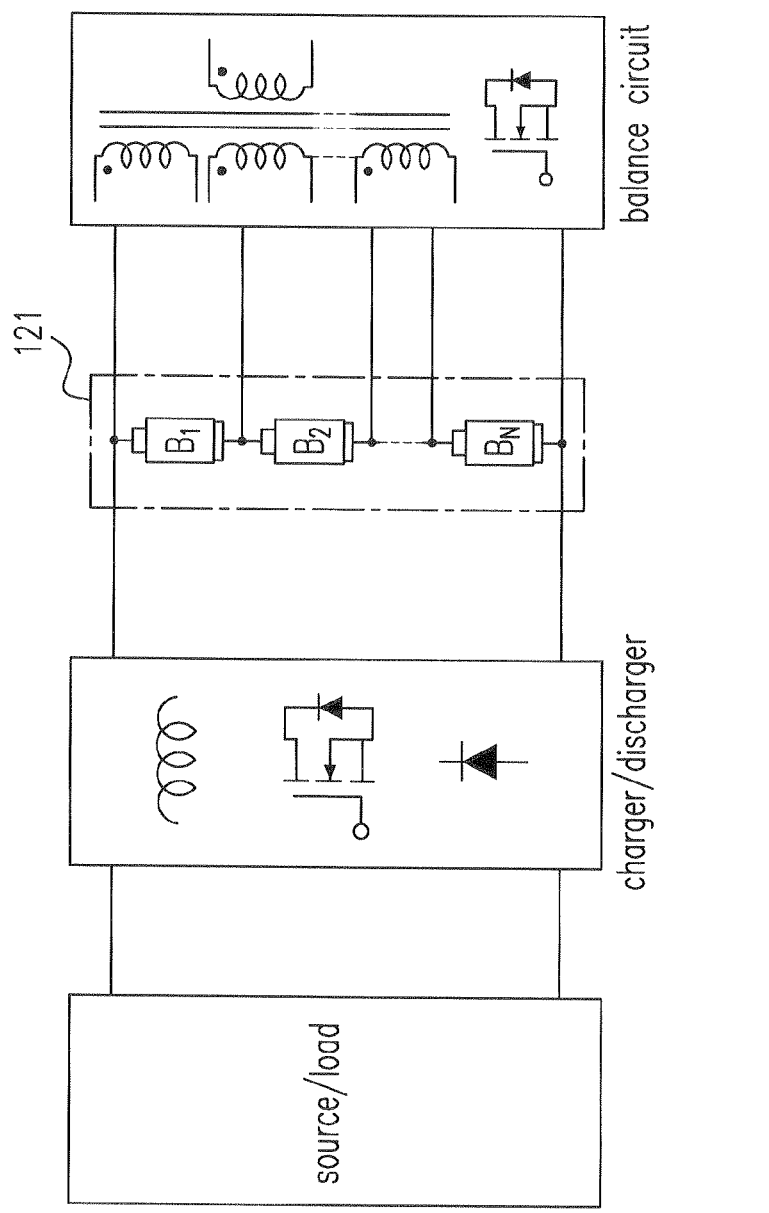
FIG. 2(a) shows a schematic diagram of a second battery equalization circuit for series charging/discharging in the prior art.
Figure 2B:
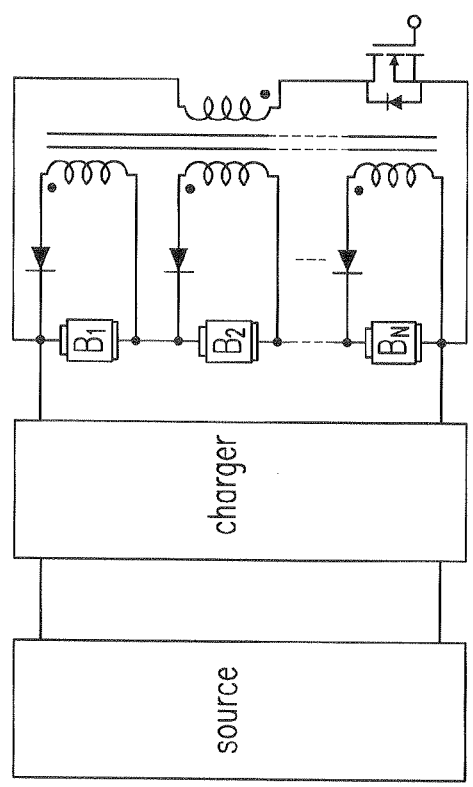
FIG. 2(b) shows a schematic circuit diagram of the second battery equalization circuit for series charging as shown in FIG. 2(a)

Comparing the conventional battery equalization circuit for series charging (as shown in FIGS. 1(b) and 2(b), including a charger and a balance circuit) with the circuit as shown in FIG. 4(a), and the results are as follows:

(1) The conventional battery equalization circuit for series charging as shown in FIG. 1(b) requires two sets of power source, and the circuit as shown in FIG. 4(a) requires only one set of power source.

(2) The conventional battery equalization circuit for series charging requires two switches and more components, and the circuit as shown in FIG. 4(a) uses a single switch $S_1$.

(3) The conventional battery equalization circuit for series charging requires separated controls of the two switches such that the complexity of the control is increased, and a single control signal of the switch $S_1$ is used in the circuit as shown in FIG. 4(a).

(4) The charging of the series-connected batteries 121 and the control of the batteries in the conventional battery equalization circuit for series charging are separated, the switch in the charger/discharger is used as the charging control switch of the series-connected batteries 121, and the switch of the balance circuit is the balancing control switch of the series-connected batteries 121 as shown in FIG. 2(a). In the circuit as shown in FIG. 4(a), when $S_1$ (the MOSFET) is under the turn-on status, it is used as the charging mode of the series-connected batteries 121, and when $S_1$ is under the turn-off status, the energy in the coupled inductor 2111 is released to balance series-connected batteries 121.

In the circuit as shown in FIG. 4(a) of the present invention, when $S_1$ is on, the DC power source DC is connected to the series-connected batteries 121 and charges in a larger current, and the coupled inductor is under an energy storage status, and when $S_1$ is off, the DC power source and the series-connected batteries 121 are open-circuited, the coupled inductor 2111 charges the series-connected batteries 121 directly, and the primary side Np releases energy to the secondary side $N_{S1}$~$N_{SN}$, i.e. to charge series-connected batteries 121, and to adjust the individual battery: the battery with lower electric quantity is charged with more energy, and on the contrary, the battery with higher electric quantity is charged with less energy.

The operational principles of the circuit as shown in FIG. 4(a) of the present invention are analyzed as follows: when $S_1$ is on, DC goes through the positive terminal (+), $S_1 \rightarrow 2111 \rightarrow B_1 \rightarrow B_2 \rightarrow \ldots \rightarrow B_N \rightarrow$ and returns to the DC negative terminal (−), and DC charges the batteries $B_1$ & $B_2$ & ... & $B_N$ to store energy therein, and Np of the 2111 is linearly increased to store energy therein, and when $S_1$ is off, 2111 goes through the route of $B_1$ & $B_2$ & ... & $B_N$ and $D_F$ to release the energy, the energy stored in 2111 is linearly decreased, the sensed voltages of secondary windings $N_{S1}$, $N_{S2}$, ..., and $N_{SN}$ are used to clamp the batteries $B_1$ & $B_2$ & ... & $B_N$. The voltages of the batteries in the circuit as shown in FIG. 4(a) of the present invention are controlled by the respective turns ratios of $N_p$ and $N_{S1}$, $N_{S2}$, ..., and $N_{SN}$, the duty cycle, and the operational frequency, and is automated clamped to the required voltage values. When the coupled inductor 2111 is operated under the status that S1 is off, the sensed current of the secondary windings $N_{S1}$, $N_{S2}$, ..., and $N_{SN}$ are respectively balance charging the batteries $B_1$ & $B_2$ & ... & $B_N$ to store the energy.

Figure 6A:
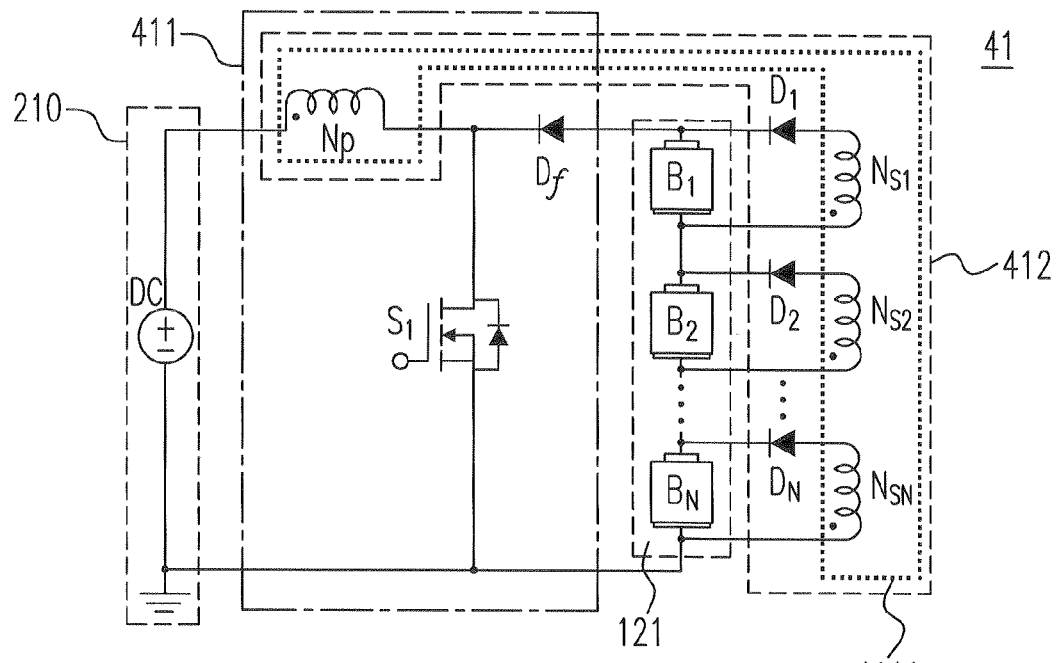
FIG. 6(a)-6(c) respectively shows a schematic circuit diagram of a boost-flyback type battery equalization circuit for series charging/discharging/charging and discharging according to the third preferred embodiment of the present invention.

FIG. 6(a) shows a schematic circuit diagram of a boost-flyback type battery equalization circuit for series charging according to the third preferred embodiment of the present invention. In FIG. 6(a), the boost-flyback type battery equalization circuit for series charging 41 includes a power source 210 (it is a DC power source DC), a boost converter 411, a balance circuit for series-connected batteries 412, and the set of series-connected batteries 121, wherein the boost converter 411 includes a switch $S_1$ (it could be a MOSFET), a flywheel diode $D_f$, and a primary winding of the coupled inductor 4111 ($N_P$ is the number of turns in the primary side, $N_{S1}$~$N_{SN}$ indicate that the respective number of turns in the secondary side and the total no. of sets is N, and the primary winding of the coupled inductor 4111 is coupled to a main inductor of the converter 411), and the balance circuit 412 includes the coupled inductor 4111 and N rectifying diodes $D_1$~$D_N$.

Figure 6B:
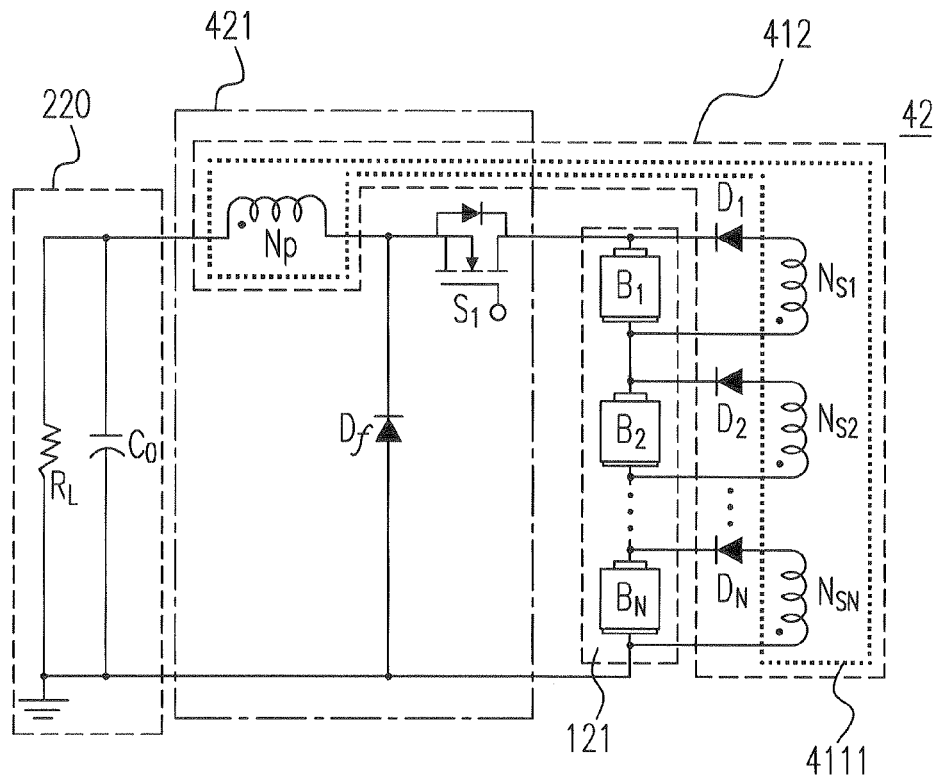

FIG. 6(b) shows a schematic circuit diagram of a boost-flyback type battery equalization circuit for series discharging according to the third preferred embodiment of the present invention. In FIG. 6(b), the boost-flyback type battery equalization circuit for series discharging 42 includes a load circuit 220 (including a load resistor $R_L$ and an output capacitor $C_O$), a boost converter 421, the balance circuit for series-connected batteries 412, and the set of series-connected batteries 121. The differences between the boost converter 421 and the boost converter 411 of FIG. 6(a) are that the switch S1 and the flywheel diode $D_f$ are switching positions.

Figure 6C:
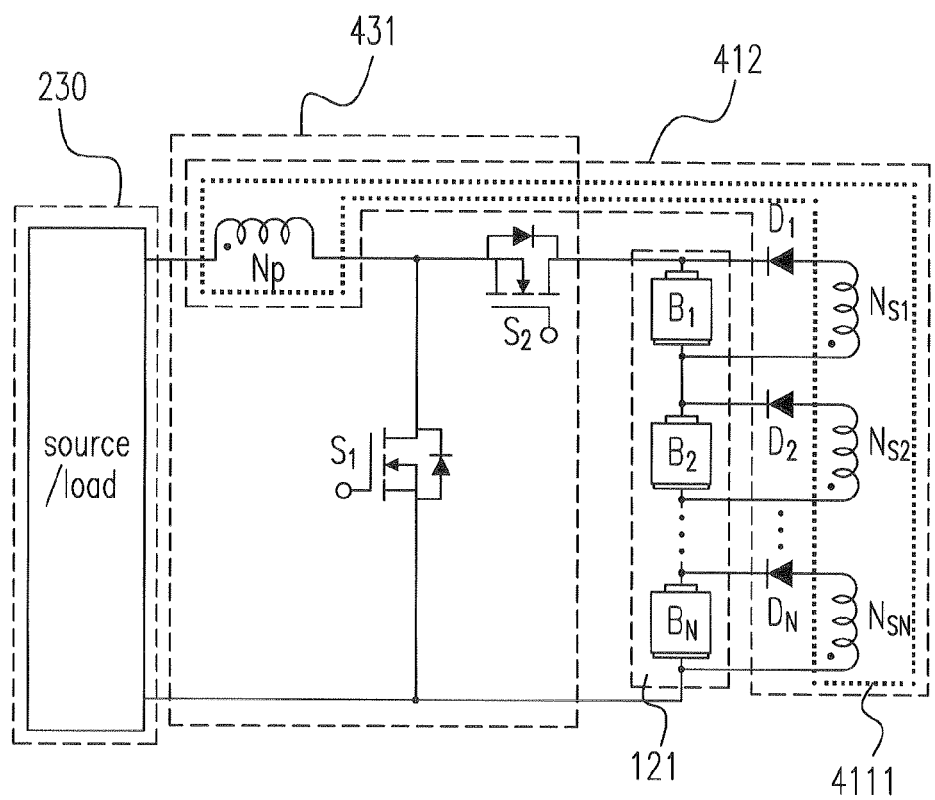

FIG. 6(c) shows a schematic circuit diagram of a boost-flyback type battery equalization circuit for series charging and discharging according to the third preferred embodiment of the present invention. In FIG. 6(c), the boost-flyback type battery equalization circuit for series charging and discharging 43 includes the power source/load 230, a boost converter 431, a balance circuit for series-connected batteries 412, and the set of series-connected batteries 121. The difference between the boost converter 431 and the boost converter 411 of FIG. 6(a) is that the flywheel diode $D_f$ is replaced by a switch $S_2$.

Figure 7A:
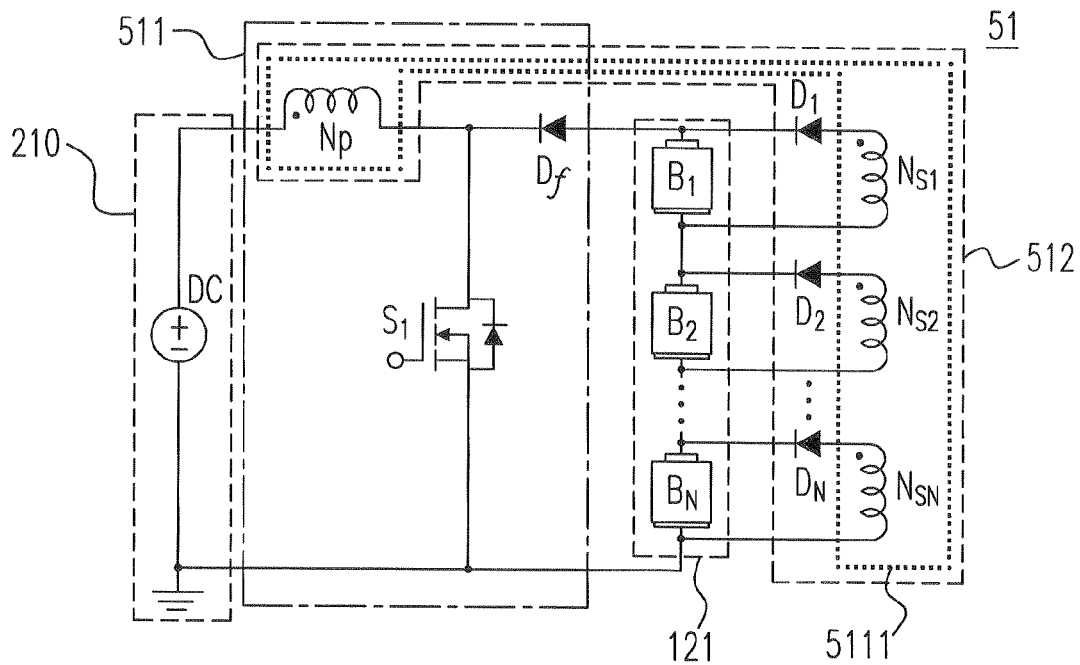
FIG. 7(a)-7(c) respectively shows a schematic circuit diagram of a boost-forward type battery equalization circuit for series charging/discharging/charging and discharging according to the fourth preferred embodiment of the present invention.

FIG. 7(a) shows a schematic circuit diagram of a boost-forward type battery equalization circuit for series charging according to the fourth preferred embodiment of the present invention. In FIG. 7(a), the boost-forward type battery equalization circuit for series charging 51 includes a power source 210 (it is a DC power source DC), a boost converter 511, a balance circuit for series-connected batteries 512, and the set of series-connected batteries 121, wherein the boost converter 511 includes a switch $S_1$ (it could be a MOSFET), a flywheel diode $D_f$, and a primary winding of the coupled inductor 5111 ($N_P$ is the number of turns in the primary side, $N_{S1}$~$N_{SN}$ indicate that the respective number of turns in the secondary side and the total no. of sets is N, and the primary winding of the coupled inductor 5111 is coupled to a main inductor of the converter 511), and the balance circuit 512 includes the coupled inductor 5111 and N rectifying diodes $D_1$~$D_N$.

Figure 7B:
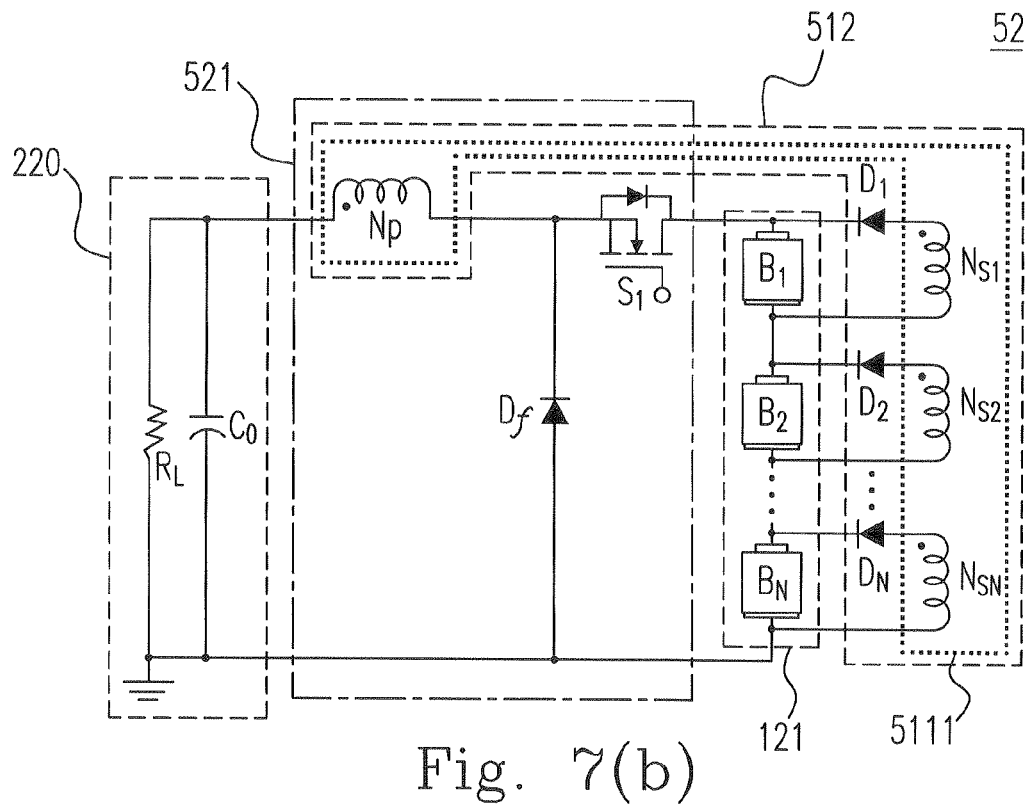

FIG. 7(b) shows a schematic circuit diagram of a boost-forward type battery equalization circuit for series discharging according to the fourth preferred embodiment of the present invention. In FIG. 7(b), the boost-forward type battery equalization circuit for series discharging 52 includes a load circuit 220 (including a load resistor $R_L$ and an output capacitor $C_O$), a boost converter 521, the balance circuit for series-connected batteries 512, and the set of series-connected batteries 121. The differences between the boost converter 521 and the boost converter 511 of FIG. 7(a) are that the switch S1 and the flywheel diode $D_f$ are switching positions.

Figure 7C:
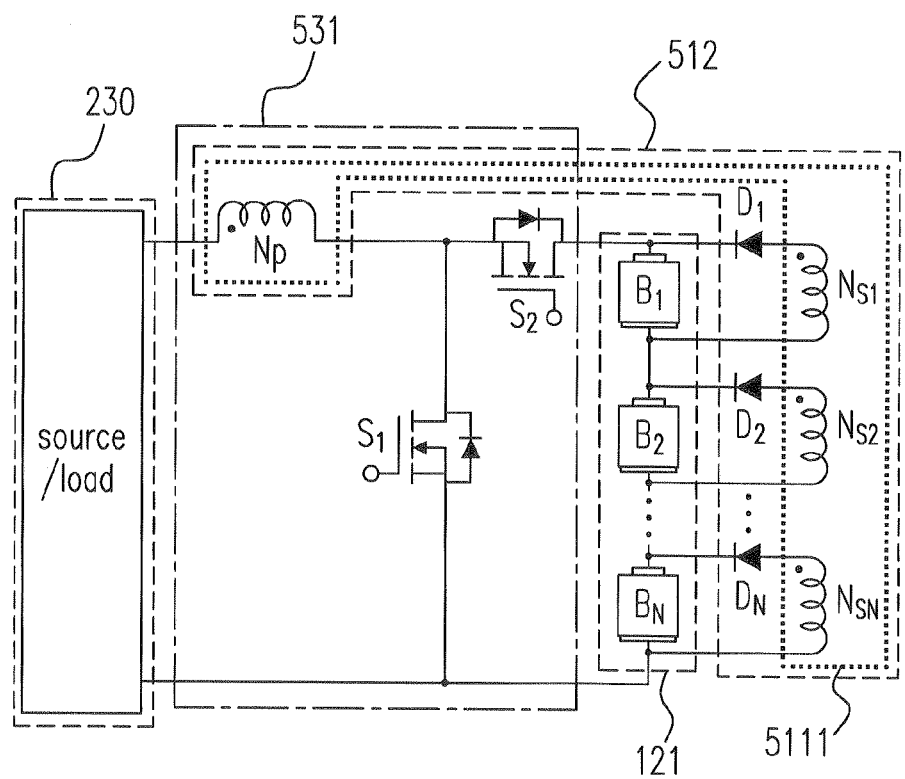

FIG. 7(c) shows a schematic circuit diagram of a boost-forward type battery equalization circuit for series charging and discharging according to the fourth preferred embodiment of the present invention. In FIG. 7(c), the boost-forward type battery equalization circuit for series charging and discharging 53 includes the power source/load 230, a boost converter 531, a balance circuit for series-connected batteries 512, and the set of series-connected batteries 121. The difference between the boost converter 531 and the boost converter 511 of FIG. 7(a) is that the flywheel diode $D_f$ is replaced by a switch S2.

The buck-flyback type battery equalization circuit for series charging/discharging, the buck-forward type battery equalization circuit for series charging/discharging, the boost-flyback type battery equalization circuit for series charging/discharging, and the boost-forward type battery equalization circuit for series charging/discharging according to the first to the fourth preferred embodiments of the present invention as shown in FIGS. 4(a)-4(c) to 7(a)-7(c) are applicable to low power applications.

Figure 8:
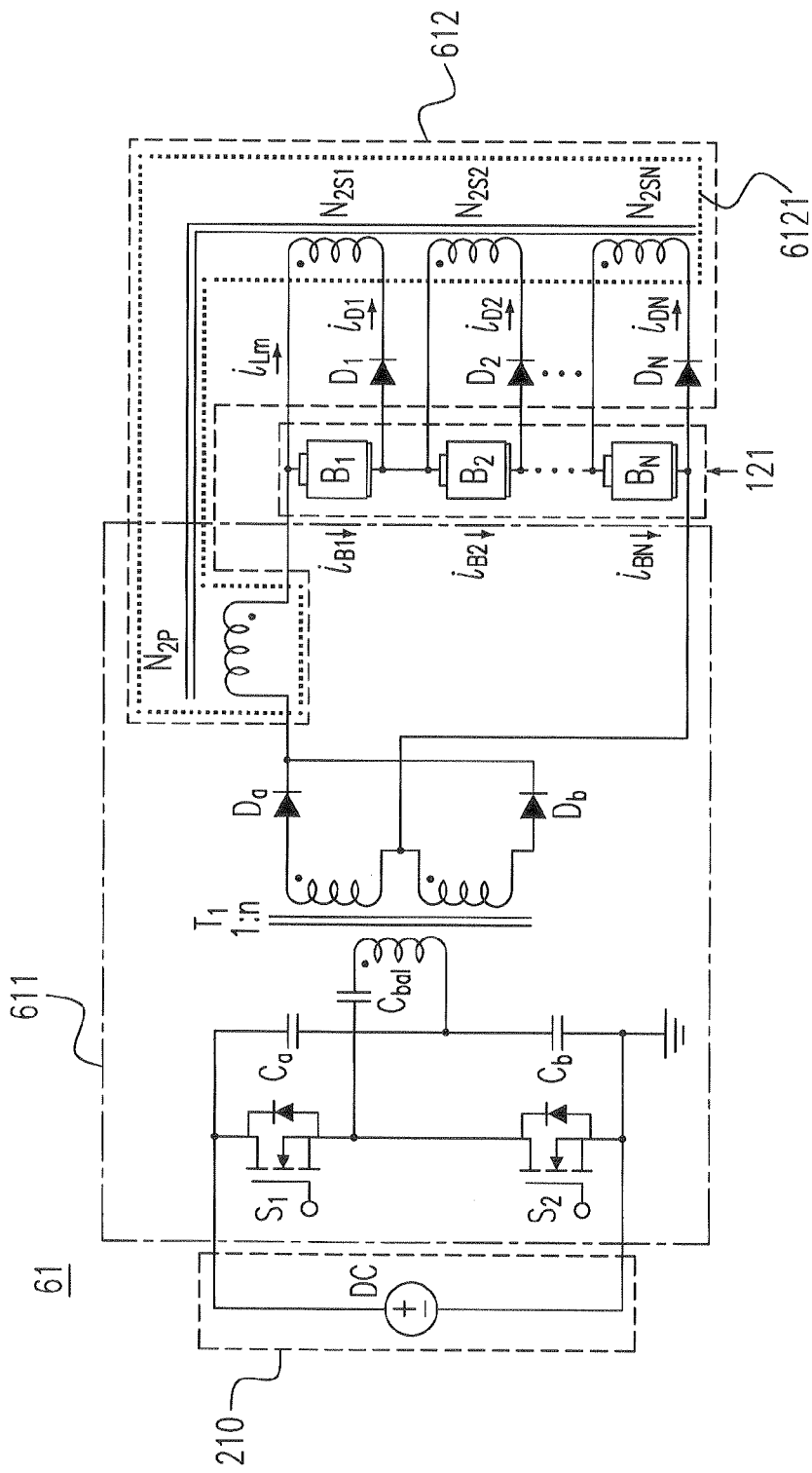
FIG. 8 shows a schematic circuit diagram of a half-bridge type battery equalization circuit for series charging according to the fifth preferred embodiment of the present invention.

FIG. 8 shows a schematic circuit diagram of a half-bridge type battery equalization circuit for series charging according to the fifth preferred embodiment of the present invention. In FIG. 8, the half-bridge type battery equalization circuit for series charging 61 includes a power source 210 (it is a DC power source DC), a half-bridge DC-DC converter 611, a balance circuit for series-connected batteries 612, and the set of series-connected batteries 121, wherein the half-bridge DC-DC converter 611 includes two switches $S_1$ & $S_2$ (they could be two MOSFETs), a transformer $T_1$, two DC capacitors $C_a$ & $C_b$, a balance capacitor $C_{ba1}$, two rectifying diodes $D_a$~$D_b$, and a primary winding of the coupled inductor 6121 ($N_{2P}$ is the number of turns in the primary side, $N_{2S1}$~$N_{2SN}$ indicate that the respective number of turns in the secondary side and the total no. of sets is N, and the primary winding of the coupled inductor 6121 is coupled to a main inductor of the converter 611), and the balance circuit for series-connected batteries 612 includes the coupled inductor 6121 and N rectifying diodes $D_1$~$D_N$, in which the DC source DC provides electric energy to the half-bridge DC-DC converter 611 to accomplish the DC-DC conversion function, and the balance circuit for series-connected batteries 612 is used for the automatic balance of the charging of the set of series-connected batteries 121.

The half-bridge type battery equalization circuit for series charging according to the fifth preferred embodiment of the present invention 61 as shown in FIG. 8 is applicable to medium power applications.

Figure 9:
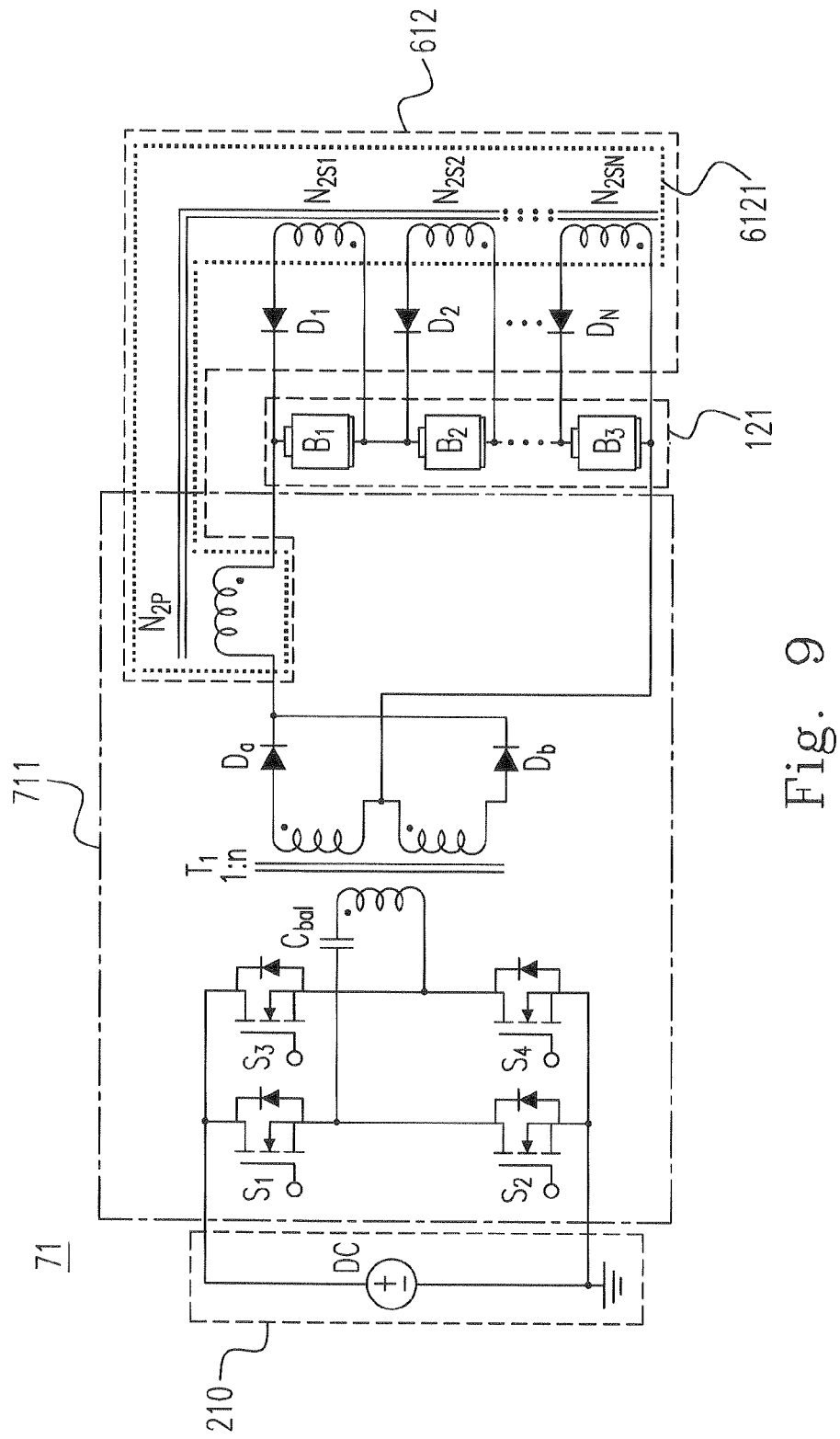
FIG. 9 shows a schematic circuit diagram of a full-bridge type battery equalization circuit for series charging according to the sixth preferred embodiment of the present invention.

FIG. 9 shows a schematic circuit diagram of a full-bridge type battery equalization circuit for series charging according to the sixth preferred embodiment of the present invention. In FIG. 9, the full-bridge type battery equalization circuit for series charging 71 includes a power source 210 (it is a DC power source DC), a full-bridge DC-DC converter 711, a balance circuit for series-connected batteries 612, and the set of series-connected batteries 121, wherein the full-bridge DC-DC converter 711 includes four switches $S_1$~$S_4$ (they could be four MOSFETs), a transformer $T_1$, a balance capacitor $C_{ba1}$, two rectifying diodes $D_a$~$D_b$, and a primary winding of the coupled inductor 6121 ($N_{2P}$ is the number of turns in the primary side, $N_{2S1}$~$N_{2SN}$ indicate that the respective number of turns in the secondary side and the total no. of sets is N, and the primary winding of the coupled inductor 6121 is coupled to a main inductor of the converter 711), and the balance circuit for series-connected batteries 612 includes the coupled inductor 6121 and N rectifying diodes $D_1$~$D_N$, in which the DC source DC provides electric energy to the full-bridge DC-DC converter 711 to accomplish the DC-DC conversion function.

Figure 10:
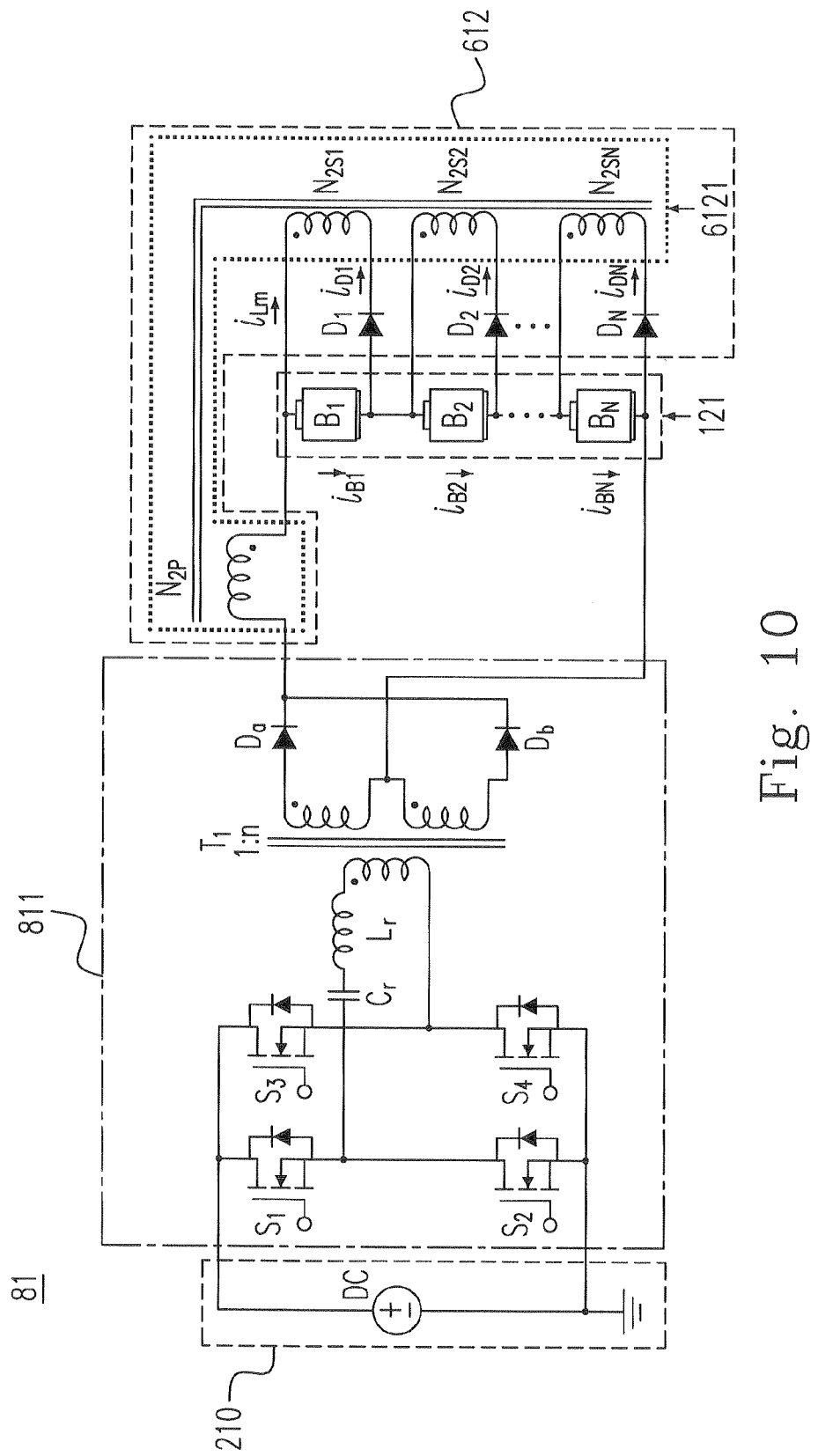
FIG. 10 shows a schematic circuit diagram of an LLC type battery equalization circuit for series charging according to the seventh preferred embodiment of the present invention.

FIG. 10 shows a schematic circuit diagram of an LLC type battery equalization circuit for series charging according to the seventh preferred embodiment of the present invention. In FIG. 10, the LLC type battery equalization circuit for series charging 81 includes a power source 210 (it is a DC power source DC), an LLC DC-DC converter 811, a balance circuit for series-connected batteries 612, and the set of series-connected batteries 121, wherein the LLC DC-DC converter 811 includes four switches $S_1$~$S_4$ (they could be four MOSFETs), a transformer $T_1$, a resonant inductor $L_r$, a resonant capacitor $C_r$ and two rectifying diodes $D_a$~$D_b$. The balance circuit for series-connected batteries 612 includes a coupled inductor 6121 ($N_{2P}$ is the number of turns in the primary side, $N_{2S1}$~$N_{2SN}$ indicate that the respective number of turns in the secondary side and the total no. of sets is N) and N rectifying diodes $D_1$~$D_N$, in which the DC source DC provides electric energy to the LLC DC-DC converter 811 to accomplish the DC-DC conversion function.

The full-bridge type battery equalization circuit for series charging according to the sixth preferred embodiment of the present invention 71 as shown in FIG. 9 and the LLC type battery equalization circuit for series charging according to the seventh preferred embodiment of the present invention 81 as shown in FIG. 10 are the preferred embodiments of the present invention applicable to large power applications.

The characteristics of the circuits as shown in the above-mentioned preferred embodiments of the present invention (e.g. FIG. 4(a) to FIG. 10) are that the coupled inductor is used to generate a branch current from the battery equalization circuit for series charging/discharging so as to balance the battery equalization circuit for series charging/discharging.

Figure 11:
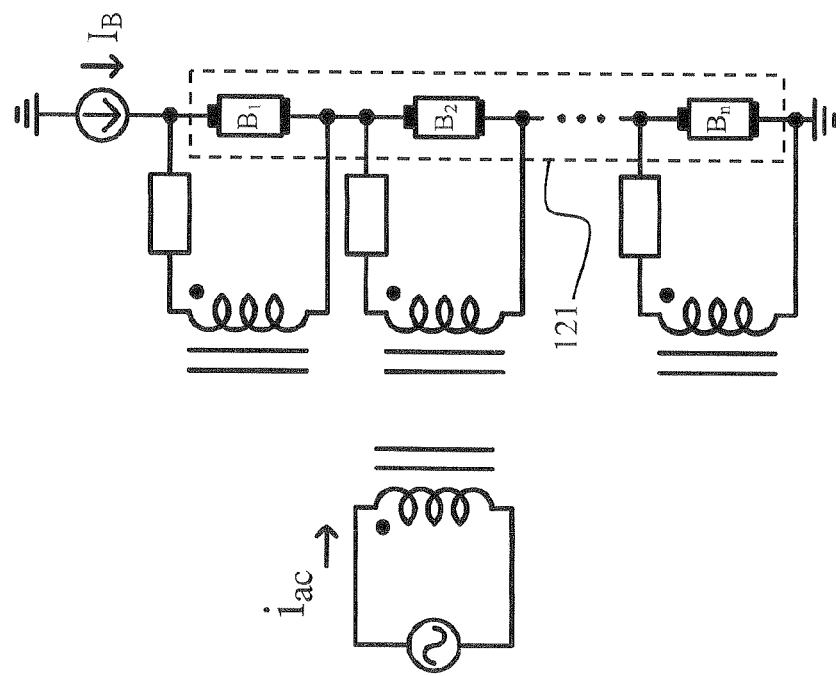
FIGS. 11(a) and 11(b) respectively show a first and a second processing ways of the balance energy in the battery equalization circuit for series charging/discharging according to the eighth and the ninth preferred embodiments of the present invention.
Figure 11A:
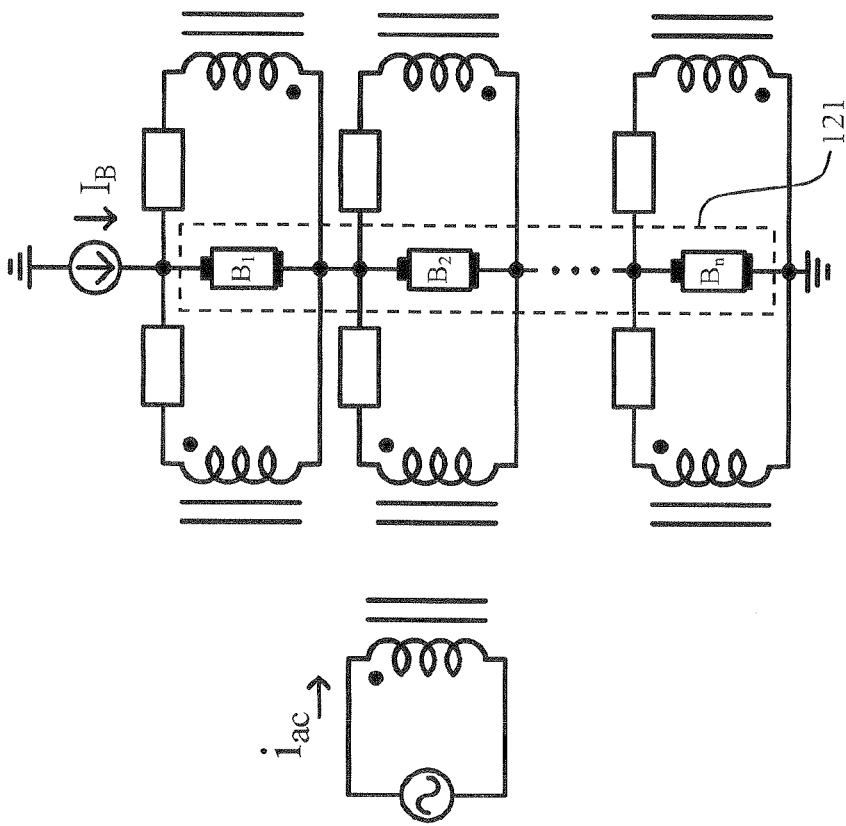

FIGS. 11(a) and 11(b) respectively show a first and a second processing ways of the balance energy in the battery equalization circuit for series charging/discharging according to the eighth and the ninth preferred embodiments of the present invention. The first processing way is shown in FIG. 11(a), i.e. a current-limiting element or a DC/AC converting element is connected between a respective battery (or a respective battery bank) of the set of the series-connected batteries 121 and each of the two secondary windings of a magnetic element. The second processing way is shown in FIG. 11(b), i.e. a current-limiting element or a DC/AC converting element is connected between a respective battery (or a respective battery bank) of the set of series-connected batteries 121 and one of the two secondary windings of a magnetic element. Besides, FIGS. 11(a) and 11(b) show the series-connected batteries 121, a current having an AC component $i_{ac}$ at the primary side of the magnetic element, and the main charging/discharging current of the series-connected batteries 121 being $I_B$.

Figure 12C:
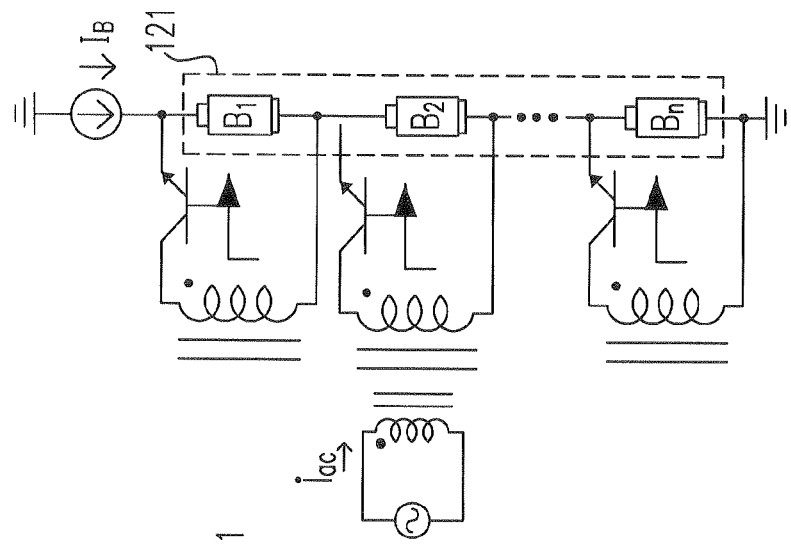
FIGS. 12(a)-12(c) respectively show a schematic circuit diagram of the battery equalization circuit for series charging/discharging according to the tenth to the twelfth preferred embodiments of the present invention.
Figure 12B:
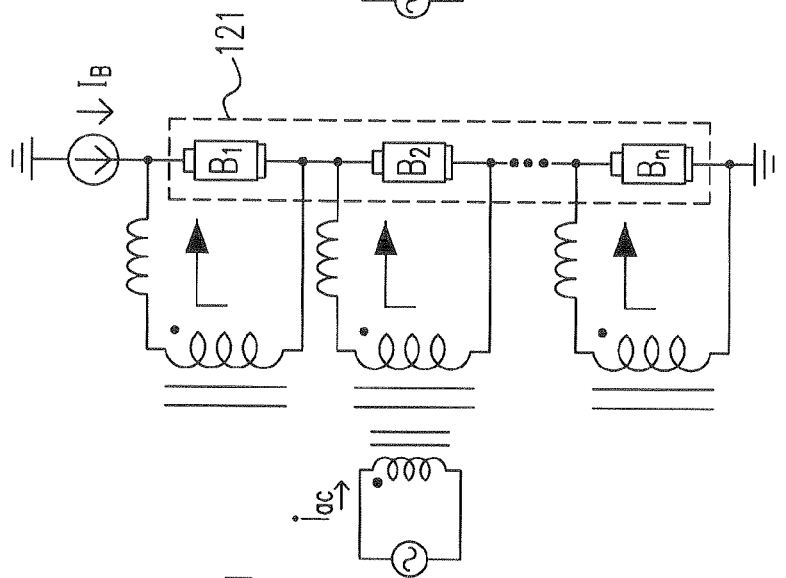
Figure 12A:
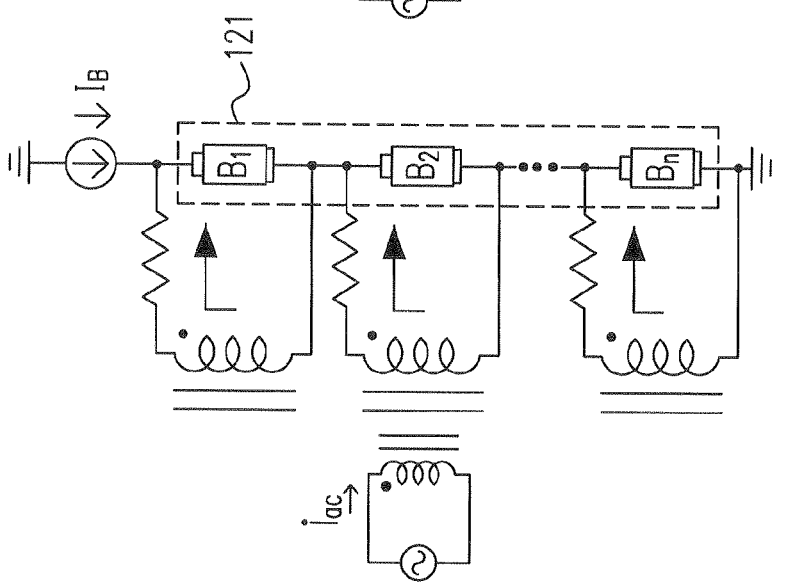

FIGS. 12(a)-12(c) respectively show a schematic circuit diagram of the battery equalization circuit for series charging/discharging with a respective current-limiting element being a resistor, an inductor and a transistor, and connected between each of the secondary windings of a magnetic element being a voltage transformer, and a respective battery (or a respective battery bank) of the set of series-connected batteries 121 according to the tenth to the twelfth preferred embodiments of the present invention. Besides, FIGS. 12(a)-12(c) show the series-connected batteries 121, a current having an AC component $i_{ac}$ at the primary side of the voltage transformer, and the main charging/discharging current of the series-connected batteries 121 being $I_B$.

Figure 13B:
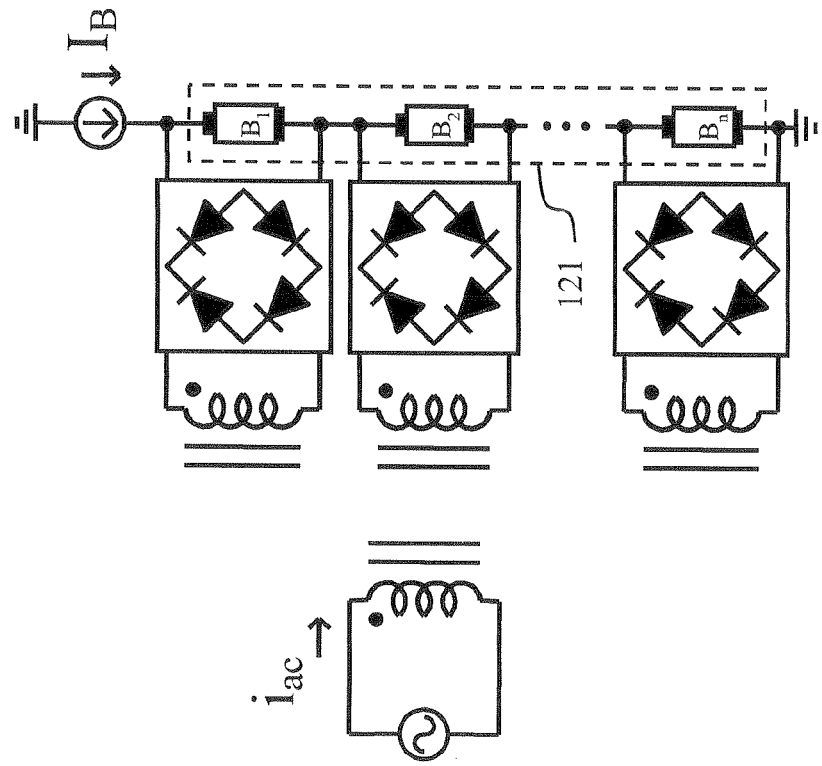
FIGS. 13(a) and 13(b) respectively show a schematic circuit diagram of the battery equalization circuit for series charging/discharging according to the thirteenth and the fourteenth preferred embodiments of the present invention.
Figure 13A:
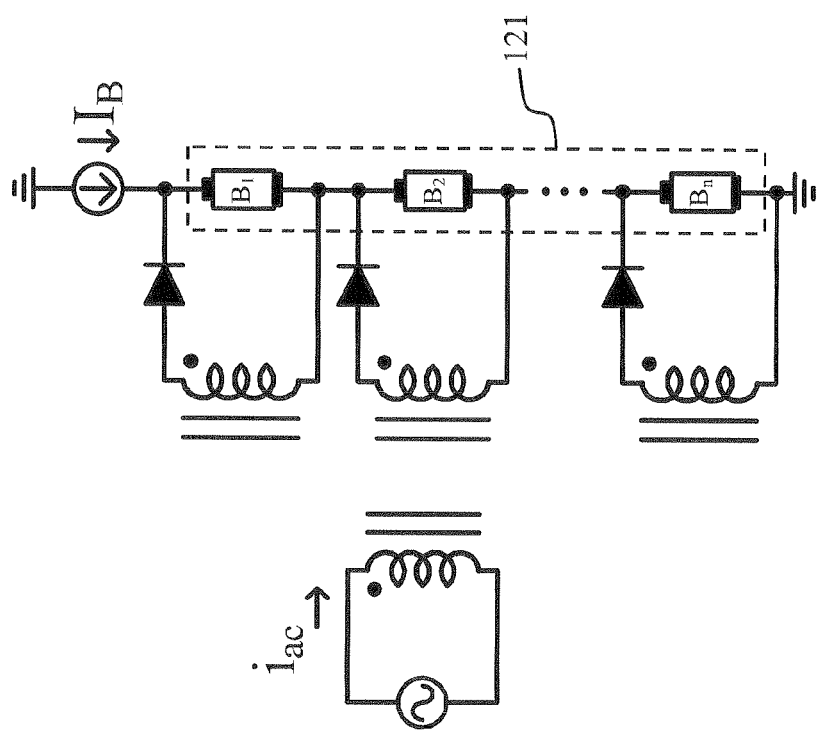

FIGS. 13(a) and 13(b) respectively show a schematic circuit diagram of the battery equalization circuit for series charging/discharging with a respective magnetic element being a coupled inductor or a current transformer, and connected between each of the secondary windings of the coupled inductor or the current transformer and a respective battery (or a respective battery bank) of the set of series-connected batteries 121 with a diode (being a passive switch) or a rectifying bridge (having 4 diodes) according to the thirteenth and the fourteenth preferred embodiments of the present invention. Besides, FIGS. 13(a) and 13(b) show the series-connected batteries 121, a current having an AC component $i_{ac}$ at the primary side of the coupled inductor or the current transformer, and the main charging/discharging current of the series-connected batteries 121 being $I_B$.

Figure 14B:
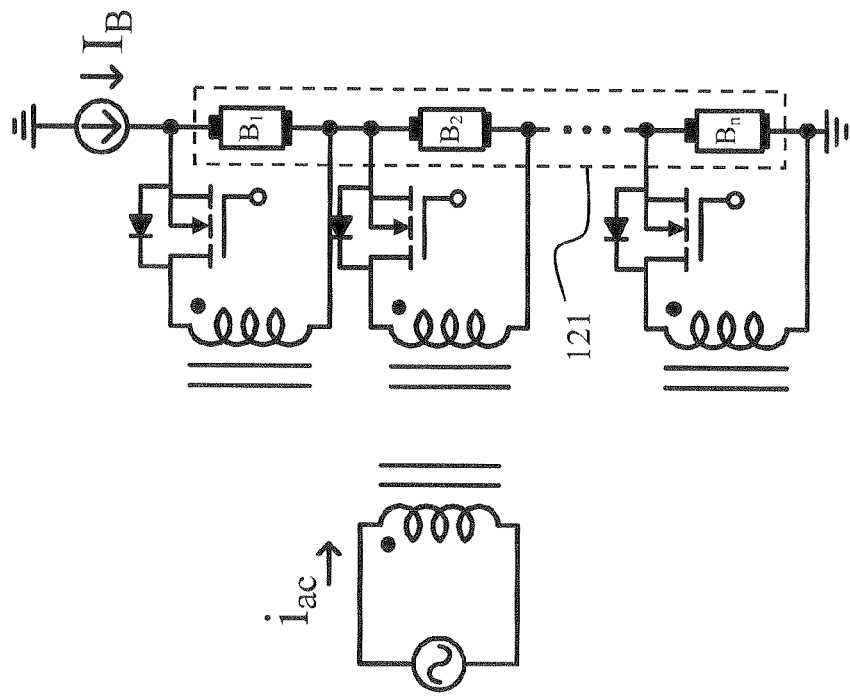
FIGS. 14(a) and 14(b) respectively show a schematic circuit diagram of the battery equalization circuit for series charging/discharging according to the fifteenth and the sixteenth preferred embodiments of the present invention.
Figure 14A:
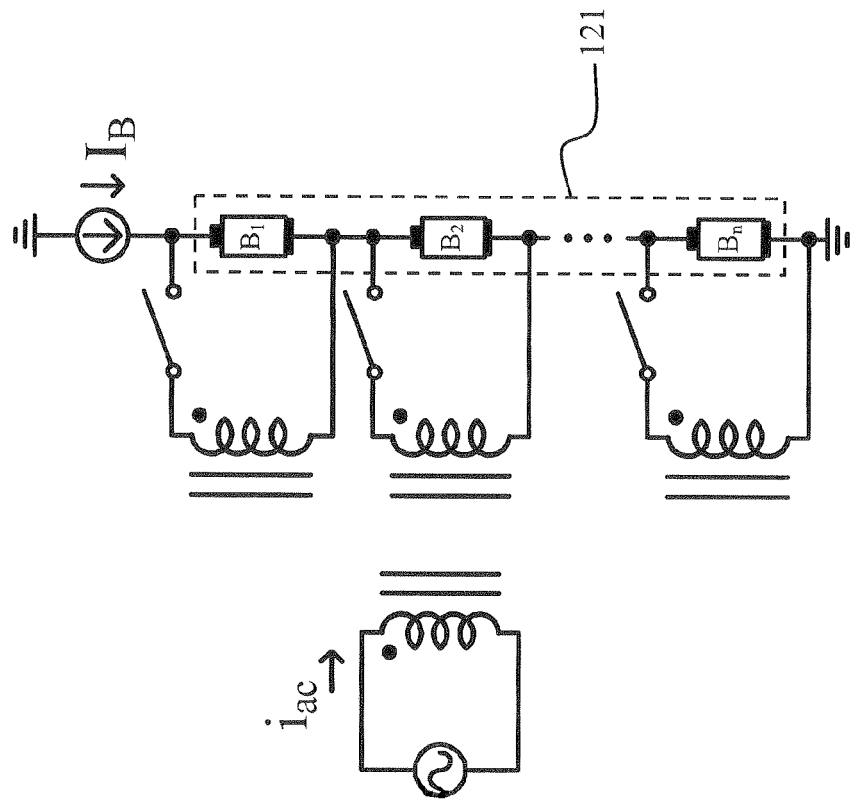

FIGS. 14(a) and 14(b) respectively show a schematic circuit diagram of the battery equalization circuit for series charging/discharging with a respective magnetic element being a coupled inductor or a current transformer, and connected between each of the secondary windings of the coupled inductor or the current transformer and a respective battery (or a respective battery bank) of the set of series-connected batteries 121 with an active switch or a transistor (being an active switch and including two statuses of charging and discharging) according to the fifteenth and the sixteenth preferred embodiments of the present invention. Besides, FIGS. 14(a) and 14(b) show the series-connected batteries 121, a current having an AC component $i_{ac}$ at the primary side of the coupled inductor or the current transformer, and the main charging/discharging current of the series-connected batteries 121 being $I_B$.

Figure 15:
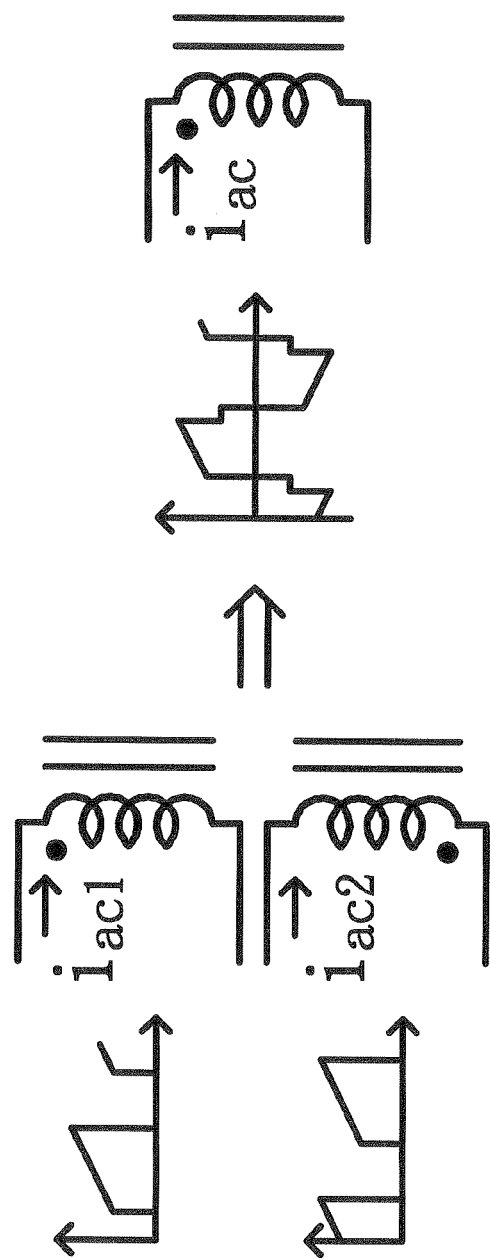
FIG. 15 shows a schematic circuit diagram of the battery equalization circuit for series charging/discharging according to the seventeenth preferred embodiment of the present invention.

FIG. 15 shows a schematic circuit diagram of the battery equalization circuit for series charging/discharging according to the seventeenth preferred embodiment of the present invention. When the magnetic element is a current transformer, it needs an AC power source. When the input AC signal has an AC component and a DC component, measures should be taken to delete the DC component so as to decrease the loss of the magnetic element since the DC component could not be coupled to the secondary side of the magnetic element. In FIG. 15, when there are two primary windings respectively receive two AC input signals having a phase shift of 180 degrees (each of which has an AC component and a DC component), the two DC components are subtracted from each other and diminished such that there is only the pure AC component left at the secondary winding thereof.

Figure 16A:
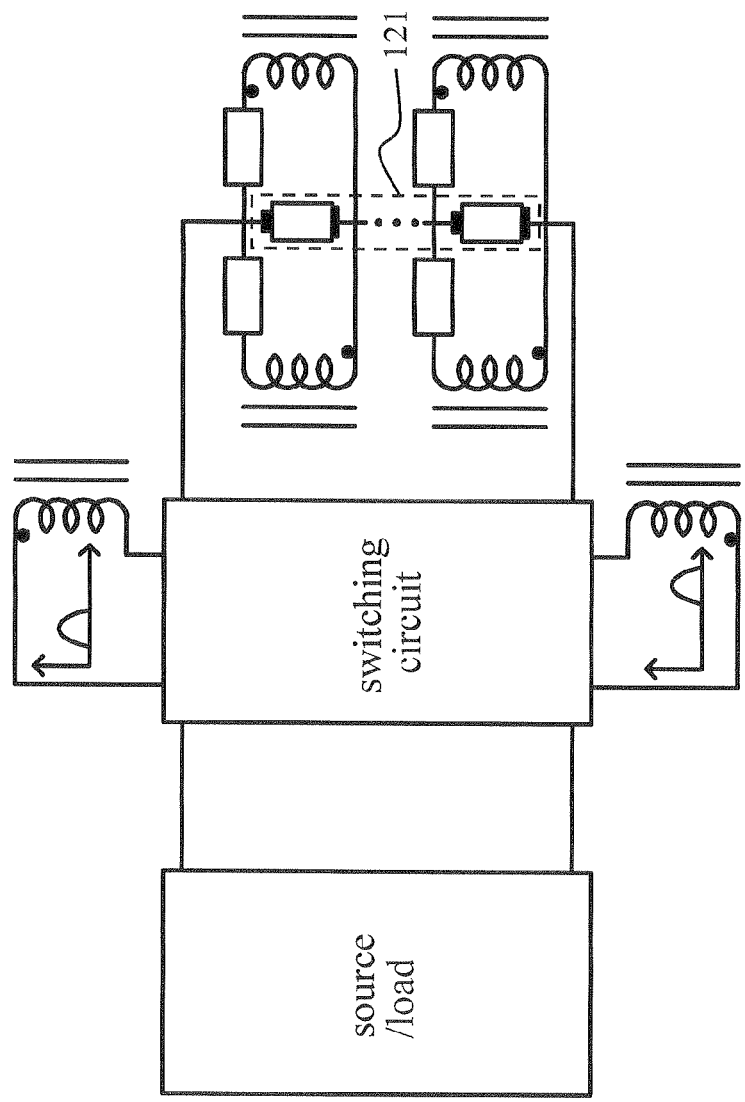
FIGS. 16(a)-16(c) respectively show a schematic circuit diagram of the battery equalization circuit for series charging/discharging according to the eighteenth to the twentieth preferred embodiments of the present invention.
Figure 16B:
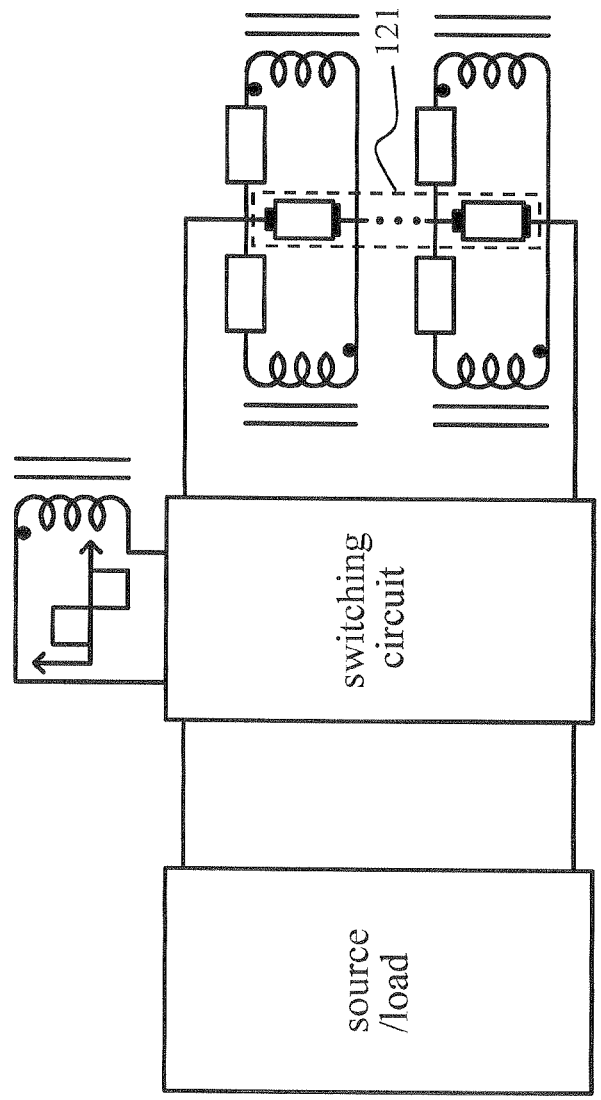
Figure 16C:
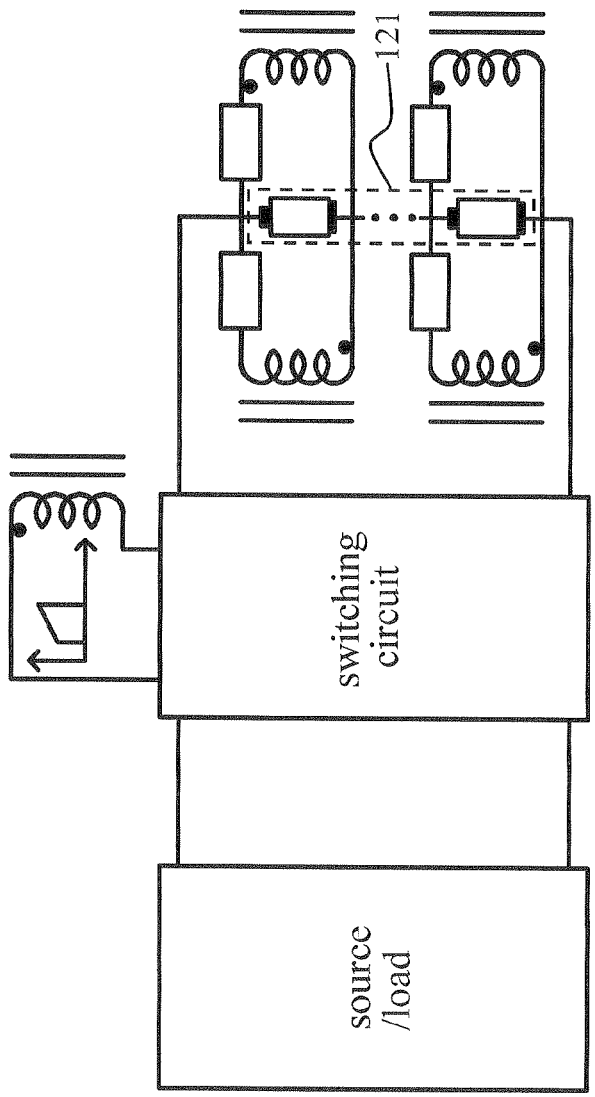

FIGS. 16(a)-16(c) respectively show a schematic circuit diagram of the battery equalization circuit for series charging/discharging according to the eighteenth to the twentieth preferred embodiments of the present invention. In FIG. 16(a), the magnetic element is a voltage transformer or a current transformer, the two primary windings of the voltage transformer or the current transformer are respectively electrically connected to the switching circuit to receive a respective AC input signal, wherein the AC input signal is a voltage signal or a current signal. There is a current-limiting element or a DC/AC converting element electrically connected between the set of series-connected batteries 121 and each of the secondary winding of the voltage transformer or the current transformer. The difference between FIG. 16(b) and FIG. 16(a) is that a primary winding of the voltage transformer or the current transformer is electrically connected to the switching circuit to receive an AC input signal, wherein the AC input signal is a pure AC voltage or a current signal. The difference between FIG. 16(c) and FIG. 16(b) is that a primary winding of the voltage transformer or the current transformer receives an AC input signal from the switching circuit, and the AC input signal is a current signal having an AC component and a DC component.

Figure 17:
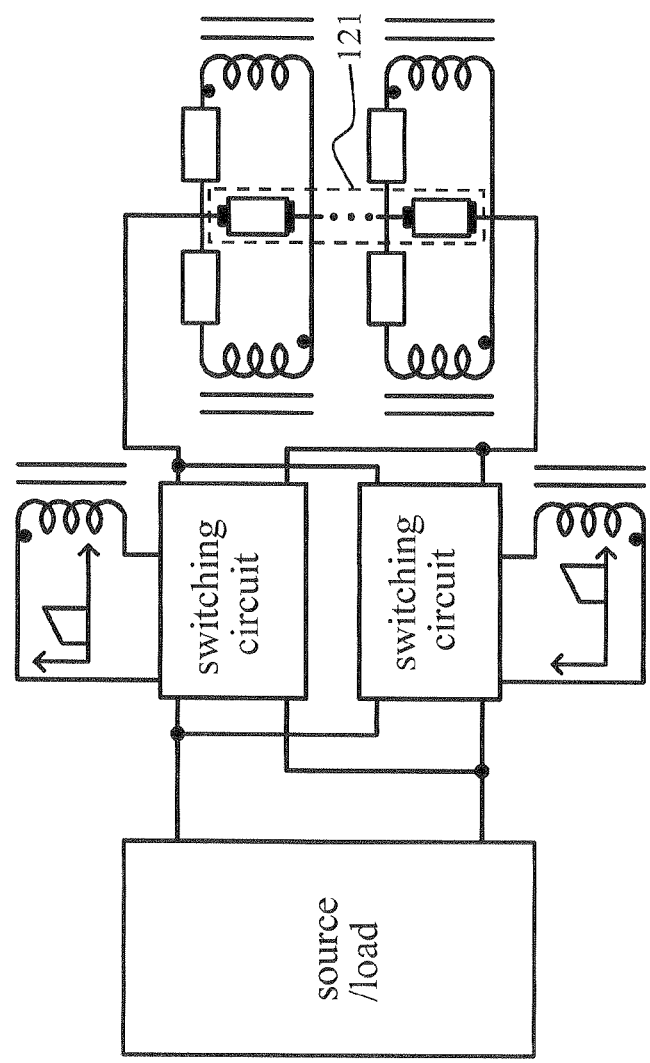
FIG. 17 shows a schematic circuit diagram of the battery equalization circuit for series charging/discharging according to the twenty first preferred embodiment of the present invention.

FIG. 17 shows a schematic circuit diagram of the battery equalization circuit for series charging/discharging according to the twenty first preferred embodiment of the present invention. As shown in FIG. 17, the magnetic element is a voltage transformer or a current transformer, the two primary windings of the voltage transformer or the current transformer are respectively electrically connected to an interleaved switching circuit or a phase-shift switching circuit to respectively receive two AC input signals having a 180 degrees phase-shift, wherein each of the two AC input signals is a voltage signal or a current signal, having an AC component and a DC component, and there is a current-limiting element or a DC/AC converting element electrically connected between the set of series-connected batteries 121 and each of the secondary winding of the voltage transformer or the current transformer.

Figure 18:
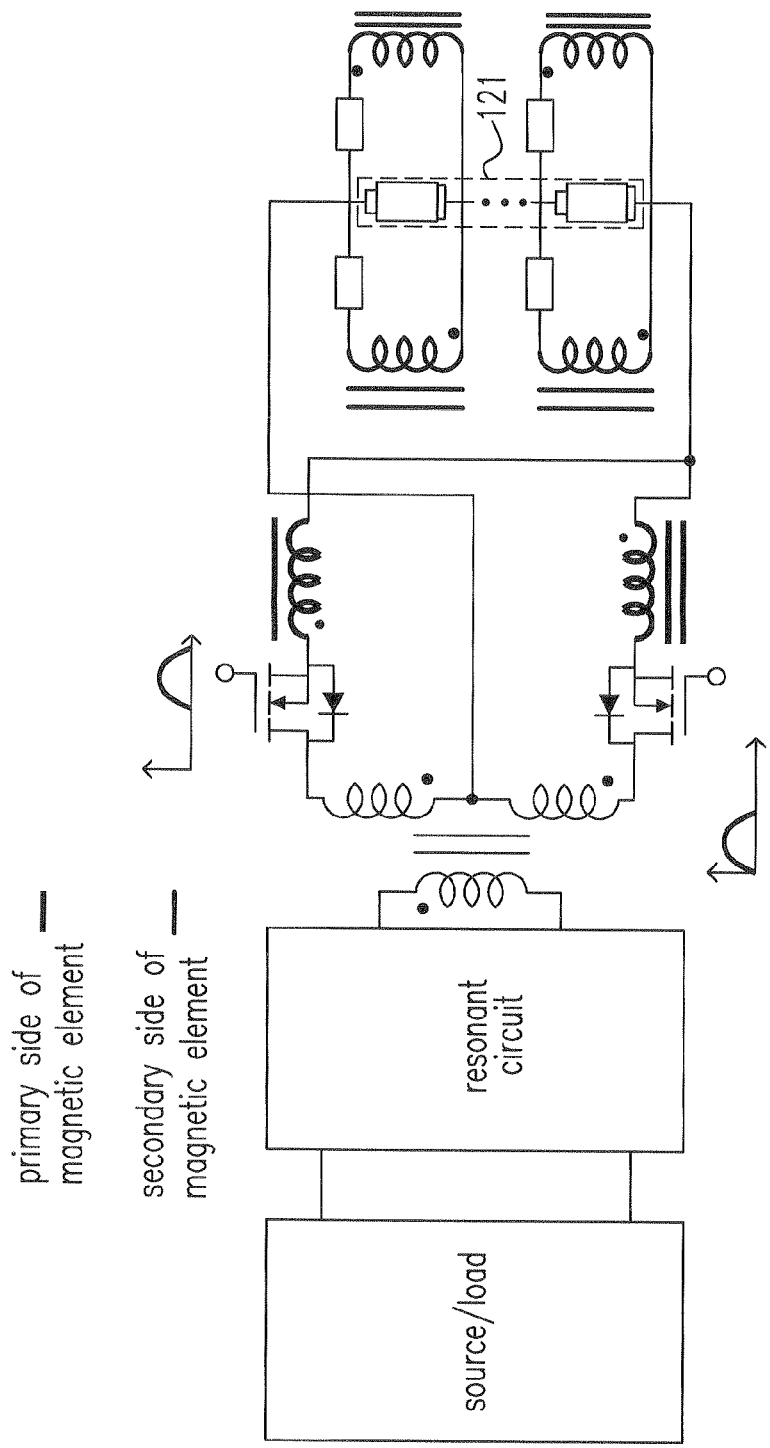
FIG. 18 shows a schematic circuit diagram of the battery equalization circuit for series charging/discharging according to the twenty second preferred embodiment of the present invention.

FIG. 18 shows a schematic circuit diagram of the battery equalization circuit for series charging/discharging according to the twenty second preferred embodiment of the present invention. As shown in FIG. 18, the magnetic element is a current transformer, the two primary windings of the current transformer are respectively electrically connected to a resonant circuit to receive a respective AC input signal having an AC component and a DC component, and there is a current-limiting element or a DC/AC converting element electrically connected between the set of series-connected batteries 121 and each of the secondary winding of the current transformer.

Figure 19:
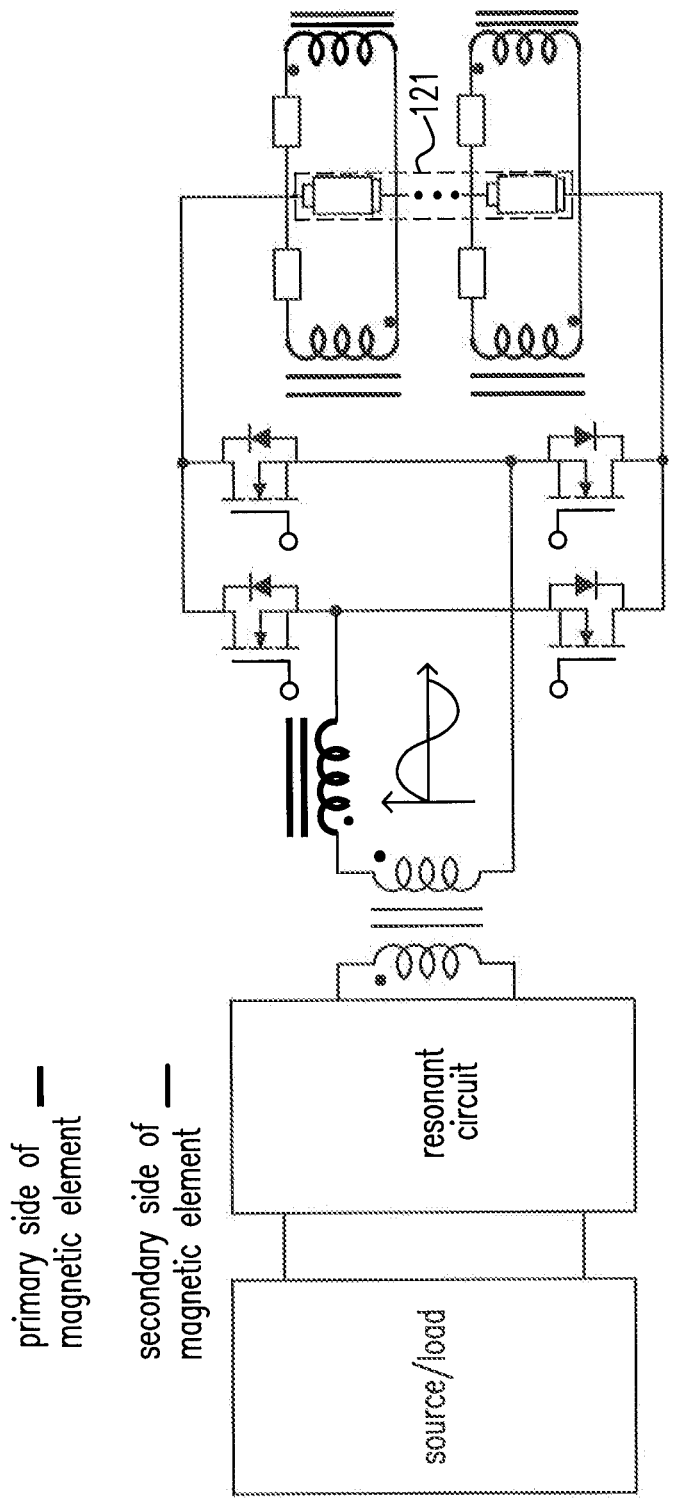
FIG. 19 shows a schematic circuit diagram of the battery equalization circuit for series charging/discharging according to the twenty third preferred embodiment of the present invention.

FIG. 19 shows a schematic circuit diagram of the battery equalization circuit for series charging/discharging according to the twenty third preferred embodiment of the present invention. As shown in FIG. 19, the magnetic element is a current transformer, a primary winding of the current transformer is electrically connected to a resonant circuit to receive an AC input signal, wherein the AC input signal has an AC component and a DC component, there is an element electrically connected between the set of series-connected batteries 121 and each of the secondary winding of the current transformer, and the element could be an active switch or a passive switch.

Embodiments

1. A battery equalization circuit, comprising:
   a balanced charging/discharging circuit, comprising:
      a converter; and
      a balance circuit, comprising:
         a set of input terminals;
         plural sets of output terminals;
         plural switches; and
         a coupled inductor having a primary winding and plural secondary windings respectively series-connected to the plural switches, wherein each of the plural sets of output terminals is connected to a respective one of the plural switches and a respective one of the plural secondary windings; and
   a set of series-connected batteries having plural batteries, each of which has a positive terminal and a negative terminal, wherein each of the plural sets of output terminals is connected to the positive and the negative terminals of a respective one of the plural batteries, and the set of input terminals is in one of two states being coupled to and being series-connected to the converter to cause a branch current to flow through the plural secondary windings so as to balance the set of series-connected batteries.

2. A battery equalization circuit according to Embodiment 1, wherein the balanced charging/discharging circuit further comprises a first and a second output terminals, the set of series-connected batteries further comprises a first terminal and a second terminal, the first terminal is connected to the first output terminal, the second terminal is connected to the second output terminal, each of the plural secondary windings and the plural switches has a first and a second terminals, the positive terminal of each of the plural batteries is connected to one of the first terminal of the respective secondary winding and the second terminal of the respective switch, the negative terminal of each of the plural batteries is connected to the first terminal of the respective switch and the second terminal of the respective switch is connected to the second terminal of the respective secondary winding when the positive terminal of each of the plural batteries is connected to the first terminal of the respective secondary winding, and the positive terminal of each of the plural batteries is connected to the second terminal of the respective switch and the first terminal of the respective switch is connected to the first terminal of the respective secondary winding when the negative terminal of each of the plural batteries is connected to the second terminal of the respective secondary winding.

3. A battery equalization circuit according to Embodiment 1 or 2, being used for charging, wherein the balanced charging/discharging circuit is a balanced charger being one of an AC to DC charger and a DC to DC charger.

4. A battery equalization circuit according to anyone of the above-mentioned Embodiments, wherein the DC to DC charger is one selected from a group consisting of a buck-flyback charger, a buck-forward charger, a boost-flyback charger, a boost-forward charger, a half-bridge charger, a full-bridge charger and an LLC charger.

5. A battery equalization circuit according to anyone of the above-mentioned Embodiments, wherein each of the buck-flyback charger, the buck-forward charger, the boost-flyback charger, the boost-forward charger, the half-bridge charger and the full-bridge charger has a main inductor, the main inductor is coupled to the primary winding of the coupled inductor, the LLC charger is an LLC-flyback charger connected to the primary winding of the coupled inductor in series, the plural switches are plural diodes, each of the plural diodes has an anode and a cathode, the first terminal of each of the plural switches is the anode of the respective diode, and the second terminal of each of the plural switches is the cathode of the respective diode.

6. A battery equalization circuit according to anyone of the above-mentioned Embodiments, being used for discharging, wherein the balanced charging/discharging circuit is a balanced discharger being one of an AC to DC discharger and a DC to DC discharger.

7. A battery equalization circuit according to anyone of the above-mentioned Embodiments, wherein the DC to DC discharger is one selected from a group consisting of a buck-flyback discharger, a buck-forward discharger, a boost-flyback discharger and a boost-forward discharger.

8. A battery equalization circuit according to anyone of the above-mentioned Embodiments, wherein each of the buck-flyback discharger, the buck-forward discharger, the boost-flyback discharger and the boost-forward discharger has a main inductor, and the main inductor is coupled to the primary winding of the coupled inductor.

9. A battery equalization circuit according to anyone of the above-mentioned Embodiments, being used for charging and discharging, wherein the balanced charging/discharging circuit is a balanced charging and discharging device being one of an AC to DC charging and discharging device and a DC to DC charging and discharging device 10. A battery equalization circuit according to anyone of the above-mentioned Embodiments, wherein the DC to DC charging and discharging device is one selected from a group consisting of a buck-flyback charging and discharging device, a buck-forward charging and discharging device, a boost-flyback charging and discharging device and a boost-forward charging and discharging device.

11. A battery equalization circuit according to anyone of the above-mentioned Embodiments, wherein each of the buck-flyback charging and discharging device, the buck-forward charging and discharging device, the boost-flyback charging and discharging device and the boost-forward charging and discharging device has a main inductor, and the main inductor is coupled to the primary winding of the coupled inductor.

12. A battery equalization circuit, comprising:
a set of series-connected batteries;
a switching converter; and
a magnetic element coupled balance circuit including a magnetic element coupled to the switching converter, wherein the magnetic element obtains a branch current from the switching converter, and the branch current flows to the set of series-connected batteries so as to cause the set of series-connected batteries to reach a balance.

13. A battery equalization circuit according to Embodiment 12, wherein the branch current is used to cause the set of series-connected batteries to perform one of a charge and a discharge so as to reach the balance, the battery equalization circuit for series charging/discharging is selected from a group consisting of a battery equalization circuit for series charging, a battery equalization circuit for series discharging and a battery equalization circuit for series charging and discharging, the magnetic element is one selected from a group consisting of a coupled inductor, a current transformer and a voltage transformer, the set of series-connected batteries includes plural battery banks, each of the plural battery banks has at least one battery, and the magnetic element has plural secondary windings.

14. A battery equalization circuit according to Embodiment 12 or 13, wherein the magnetic element coupled balance circuit includes plural power switches when the magnetic element is one of the coupled inductor and the current transformer, each of the plural power switches has a function being one of rectifying and AC/DC converting, there is at least one power switch between the respective secondary winding and the respective battery bank, and each of the plural power switches is one of an active switch and a passive switch, wherein the active switch is a transistor, and the passive switch is a diode.

15. A battery equalization circuit according to anyone of the above-mentioned Embodiments, wherein the branch current of the switching converter has one of a pure AC component, and an AC component with a DC component, and the magnetic element is used to provide one of the AC component and the pure AC component as a balance energy for each of the plural battery banks.

16. A battery equalization circuit according to anyone of the above-mentioned Embodiments, wherein one of the current transformer and the voltage transformer further comprises two primary windings, and when it is one of two states being that the two primary windings of the voltage transformer respectively receive two voltage waves having a phase shift of 180 degrees and that the two primary windings of the current transformer respectively receive two current waves having a phase shift of 180 degrees, two DC components included in one of the two voltage waves and the two current waves are subtracted from each other and diminished such that there is only the AC component left.

17. A battery equalization circuit according to anyone of the above-mentioned Embodiments, wherein the magnetic element coupled balance circuit further comprises plural current limiting elements when the magnetic element is the voltage transformer, and there is a current limiting element between the respective secondary winding and the respective battery bank, wherein the current limiting element is one selected from a group consisting of a resistor, an inductor and a transistor.

18. A controlling method of a battery equalization circuit, wherein the battery equalization circuit includes a magnetic element, comprising a step of using the magnetic element to generate a branch current from the battery equalization circuit so as to balance the battery equalization circuit.

19. A controlling method according to Embodiment 18, wherein the battery equalization circuit is one selected from a group consisting of a battery equalization circuit for series charging, a battery equalization circuit for series discharging and a battery equalization circuit for series charging and discharging.

20. A controlling method according to Embodiment 18 or 19, wherein the battery equalization circuit for series charging comprises a balanced charger being one of an AC to DC charger and a DC to DC charger, the battery equalization circuit for series discharging comprises a balanced discharger being one of an AC to DC discharger and a DC to DC discharger, and the battery equalization circuit for series charging and discharging comprises a balanced charging and discharging device being one of an AC to DC charging and discharging device and a DC to DC charging and discharging device.

According to the aforementioned descriptions, the present invention provides a battery equalization circuit for series charging/discharging and controlling method thereof. The proposed battery equalization circuit possesses the advantages of having a lower cost, a flexible control and a simple protection apparatus, and being easy to maintain, easy to achieve the battery equalization, and easy to accomplish the battery management.

While the present invention has been described in terms of what are presently considered to be the most practical and preferred embodiments, it is to be understood that the present invention need not be restricted to the disclosed embodiments. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A battery equalization circuit, comprising:
    a balanced charging/discharging circuit, comprising:
        a converter; and
        a balance circuit, comprising:
            a set of input terminals;
            plural sets of output terminals;
            plural switches; and
            a coupled inductor having a primary winding and plural secondary windings respectively series-connected to the plural switches, wherein each of the plural sets of output terminals is connected to a respective one of the plural switches and a respective one of the plural secondary windings; and
    a set of series-connected batteries having plural batteries, each of which has a positive terminal and a negative terminal, wherein each of the plural sets of output terminals is connected to the positive and the negative terminals of a respective one of the plural batteries, and the set of input terminals is in one of two states being coupled to and being series-connected to the converter to cause a branch current to flow through the plural secondary windings so as to balance the set of series-connected batteries.

2. The battery equalization circuit according to claim 1, wherein the balanced charging/discharging circuit further comprises a first and a second output terminals, the set of series-connected batteries further comprises a first terminal and a second terminal, the first terminal is connected to the first output terminal, the second terminal is connected to the second output terminal, each of the plural secondary windings and the plural switches has a first and a second terminals, the positive terminal of each of the plural batteries is connected to one of the first terminal of the respective secondary winding and the second terminal of the respective switch, the negative terminal of each of the plural batteries is connected to the first terminal of the respective switch and the second terminal of the respective switch is connected to the second terminal of the respective secondary winding when the positive terminal of each of the plural batteries is connected to the first terminal of the respective secondary winding, and the positive terminal of each of the plural batteries is connected to the second terminal of the respective switch and the first terminal of the respective switch is connected to the first terminal of the respective secondary winding when the negative terminal of each of the plural batteries is connected to the second terminal of the respective secondary winding.

3. The battery equalization circuit according to claim 2, being used for charging, wherein the balanced charging/discharging circuit is a balanced charger being one of an AC to DC charger and a DC to DC charger.

4. The battery equalization circuit according to claim 3, wherein the DC to DC charger is one selected from a group consisting of a buck-flyback charger, a buck-forward charger, a boost-flyback charger, a boost-forward charger, a half-bridge charger, a full-bridge charger and an LLC charger.

5. The A battery equalization circuit according to claim 4, wherein each of the buck-flyback charger, the buck-forward charger, the boost-flyback charger, the boost-forward charger, the half-bridge charger and the full-bridge charger has a main inductor, the main inductor is coupled to the primary winding of the coupled inductor, the LLC charger is an LLC-flyback charger connected to the primary winding of the coupled inductor in series, the plural switches are plural diodes, each of the plural diodes has an anode and a cathode, the first terminal of each of the plural switches is the anode of the respective diode, and the second terminal of each of the plural switches is the cathode of the respective diode.

6. The battery equalization circuit according to claim 2, being used for discharging, wherein the balanced charging/discharging circuit is a balanced discharger being one of an AC to DC discharger and a DC to DC discharger.

7. The A battery equalization circuit according to claim 6, wherein the DC to DC discharger is one selected from a group consisting of a buck-flyback discharger, a buck-forward discharger, a boost-flyback discharger and a boost-forward discharger.

8. The battery equalization circuit according to claim 7, wherein each of the buck-flyback discharger, the buck-forward discharger, the boost-flyback discharger and the boost-forward discharger has a main inductor, and the main inductor is coupled to the primary winding of the coupled inductor.

9. The battery equalization circuit according to claim 2, being used for charging and discharging, wherein the balanced charging/discharging circuit is a balanced charging and discharging device being one of an AC to DC charging and discharging device and a DC to DC charging and discharging device.

10. The battery equalization circuit according to claim 9, wherein the DC to DC charging and discharging device is one selected from a group consisting of a buck-flyback charging and discharging device, a buck-forward charging and discharging device, a boost-flyback charging and discharging device and a boost-forward charging and discharging device.

11. The battery equalization circuit according to claim 10, wherein each of the buck-flyback charging and discharging device, the buck-forward charging and discharging device, the boost-flyback charging and discharging device and the boost-forward charging and discharging device has a main inductor, and the main inductor is coupled to the primary winding of the coupled inductor.

12. A battery equalization circuit, comprising:
a set of series-connected batteries;
a switching converter; and
a magnetic element coupled balance circuit including a magnetic element coupled to the switching converter, wherein the magnetic element obtains a branch current from the switching converter, the branch current flows to the set of series-connected batteries so as to cause the set of series-connected batteries to reach a balance, the branch current is used to cause the set of series-connected batteries to perform one of a charge and a discharge so as to reach the balance, the battery equalization circuit for series charging/discharging is selected from a group consisting of a battery equalization circuit for series charging, a battery equalization circuit for series discharging and a battery equalization circuit for series charging and discharging, the magnetic element is one selected from a group consisting of a coupled inductor, a current transformer and a voltage transformer, the set of series-connected batteries includes plural battery banks, each of the plural battery banks has at least one battery, and the magnetic element has plural secondary windings.

13. The battery equalization circuit according to claim 12, wherein the magnetic element coupled balance circuit includes plural power switches when the magnetic element is one of the coupled inductor and the current transformer, each of the plural power switches has a function being one of rectifying and AC/DC interchanging, there is at least one power switch between the respective secondary winding and the respective battery bank, and each of the plural power switches is one of an active switch and a passive switch, wherein the active switch is a transistor, and the passive switch is a diode.

14. The battery equalization circuit according to claim 12, wherein the branch current of the switching converter has one of a pure AC component, and an AC component with a DC component, and the magnetic element is used to provide one of the AC component and the pure AC component as a balance energy for each of the plural battery banks.

15. The battery equalization circuit according to claim 14, wherein one of the current transformer and the voltage transformer further comprises two primary windings, and when it is one of two states being that the two primary windings of the voltage transformer respectively receive two voltage waves having a phase shift of 180 degrees and that the two primary windings of the current transformer respectively receive two current waves having a phase shift of 180 degrees, two DC components included in one of the two voltage waves and the two current waves are subtracted from each other and diminished such that there is only the AC component left.

16. The battery equalization circuit according to claim 12, wherein the magnetic element coupled balance circuit further comprises plural current limiting elements when the magnetic element is the transformer, and there is a current limiting element between the respective secondary winding and the respective battery bank, wherein the current limiting element is one selected from a group consisting of a resistor, an inductor and a transistor.

* * * * *